US012650438B2

(12) United States Patent
Bechmann et al.

(10) Patent No.: US 12,650,438 B2
(45) Date of Patent: Jun. 9, 2026

(54) LABORATORY INSTRUMENT AND INSERTABLE NETWORK INSTRUMENT

(71) Applicant: Eppendorf SE, Hamburg (DE)

(72) Inventors: Gregor Bechmann, Hamburg (DE); Steffen Buller, Hamburg (DE); Andreas Graff, Hamburg (DE); Cristoph Jolie, Hamburg (DE); Hauke Maltzen, Hamburg (DE); Sören Mensch, Hamburg (DE); Martin Stranzinger, Hamburg (DE); Lutz Timmann, Hamburg (DE); Wolf Wente, Hamburg (DE); Thomas Uschkureit, Hamburg (DE)

(73) Assignee: EPPENDORF SE, Hamburg (DE)

( * ) Notice: Subject to any disclaimer, the term of this patent is extended or adjusted under 35 U.S.C. 154(b) by 626 days.

(21) Appl. No.: 16/614,326

(22) PCT Filed: May 14, 2018

(86) PCT No.: PCT/EP2018/062339

§ 371 (c)(1),
(2) Date: Nov. 15, 2019

(87) PCT Pub. No.: WO2018/210726

PCT Pub. Date: Nov. 22, 2018

(65) Prior Publication Data

US 2020/0191813 A1     Jun. 18, 2020

(30) Foreign Application Priority Data

May 15, 2017     (EP) ..................................... 17171179

(51) Int. Cl.
| | |
|---|---|
| *G01N 35/00* | (2006.01) |
| *B01L 1/00* | (2006.01) |
| *B01L 9/00* | (2006.01) |

(52) U.S. Cl.
CPC ................ *G01N 35/00* (2013.01); *B01L 1/00* (2013.01); *B01L 9/523* (2013.01); *G01N 35/00871* (2013.01); *B01L 2200/147* (2013.01); *B01L 2300/023* (2013.01); *G01N 2035/00881* (2013.01)

(58) Field of Classification Search
None
See application file for complete search history.

(56) References Cited

U.S. PATENT DOCUMENTS

| | | | |
|---|---|---|---|
| 4,755,149 A | | 7/1988 | De Jong et al. |
| 5,580,523 A | * | 12/1996 | Bard ...................... B01L 9/527 |
| | | | 422/129 |
| 2002/0069760 A1 | * | 6/2002 | Pruette .................... B03C 3/025 |
| | | | 96/70 |
| 2002/0090320 A1 | | 7/2002 | Burow et al. |
| 2003/0215357 A1 | | 11/2003 | Malterer et al. |
| 2005/0100937 A1 | * | 5/2005 | Holmes ................ A61B 5/1473 |
| | | | 435/6.12 |
| 2006/0073723 A1 | | 4/2006 | Cowhill et al. |
| 2006/0283944 A1 | | 12/2006 | Holley |
| 2007/0111575 A1 | | 5/2007 | Jensen et al. |
| 2007/0237675 A1 | | 10/2007 | Nichols et al. |
| 2008/0243394 A1 | * | 10/2008 | Petricoin ................ G16B 45/00 |
| | | | 702/19 |
| 2008/0253927 A1 | | 10/2008 | Burow et al. |
| 2011/0184536 A1 | | 7/2011 | Tanoshima et al. |

FOREIGN PATENT DOCUMENTS

| | | | | | |
|---|---|---|---|---|---|
| CA | 2433145 | * | 5/2002 | ............... | B01L 3/00 |
| CN | 103946364 A | | 7/2014 | | |
| JP | 1992(H4)-271084 | | 9/1992 | | |
| JP | 2006-049121 A | | 2/2006 | | |
| JP | 2006043569 A | | 2/2006 | | |
| JP | 2006-149232 A | | 6/2006 | | |
| JP | 2007288748 A | | 11/2007 | | |
| JP | 2011-54485 A | | 3/2011 | | |
| JP | 2012-009728 A | | 1/2012 | | |
| JP | 2008200671 A | | 6/2012 | | |
| JP | 2011153960 A | | 3/2014 | | |

(Continued)

OTHER PUBLICATIONS

U.S. Appl. No. 16/614,324, entitled, "Laboratory Instrument and Insertable Network Instrument", filed Nov. 15, 2019, (U.S. Pat. No. 12,117,458 issued Oct. 15, 2024) of Eppendorf SE.

*Primary Examiner* — Ann Montgomery
(74) *Attorney, Agent, or Firm* — Todd Lorenz

(57) ABSTRACT

The invention relates to a laboratory instrument for working on laboratory samples, and a network instrument insertable inside a working chamber of the laboratory instrument. The laboratory instrument comprises a working chamber for housing the laboratory sam-ples, a network interface appa-ratus for providing a network connection capable of ex-changing data for the at least one network instrument, when the same is arranged and installed in an installed position inside the working chamber, the network interface appa-ratus comprising a communication apparatus being arranged outside the working cham-ber and providing the network connection, and a connector apparatus including at least one first connector for connecting with the network instrument, the at least one first con-nector being arranged facing the inside of the working chamber and being connected with the communication apparatus for allowing the data exchange.

11 Claims, 8 Drawing Sheets

(56) References Cited

FOREIGN PATENT DOCUMENTS

| JP | 2014530358 | A | 11/2014 | |
|----|------------|---|---------|---|
| JP | 2015525553 | A | 9/2015 | |
| WO | WO 94/11838 | A1 | 5/1994 | |
| WO | WO 2012045417 | * | 4/2012 | |
| WO | WO 2017059273 | * | 4/2017 | ............... B01L 3/00 |

* cited by examiner

Fig. 4a
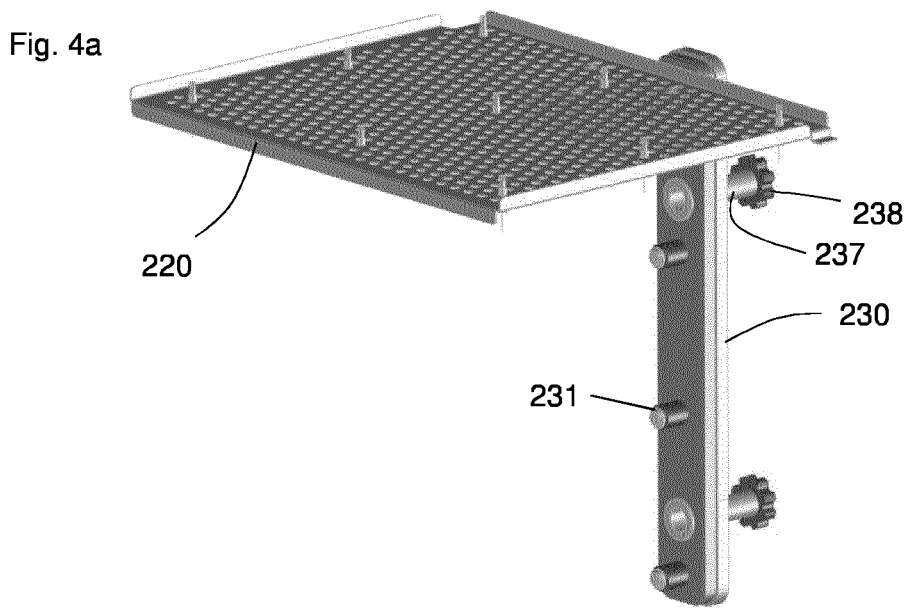
Fig. 4b
Fig. 4c
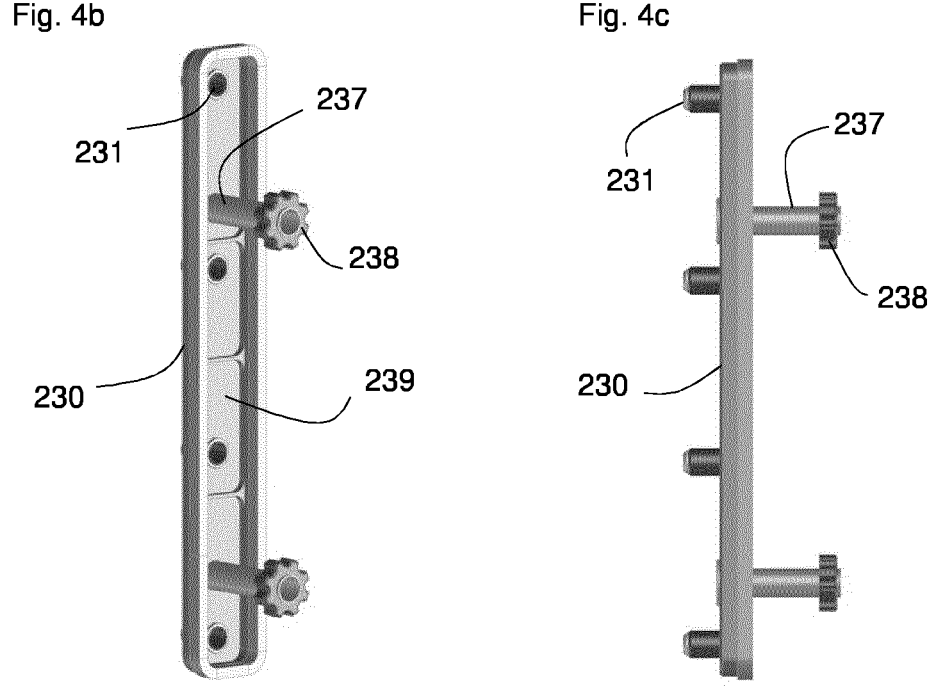

LABORATORY INSTRUMENT AND INSERTABLE NETWORK INSTRUMENT

The invention relates to a laboratory instrument for working on laboratory samples, and a network instrument insertable inside a working chamber of the laboratory instrument.

Laboratory instruments are used in chemical, biological, biochemical, medical or forensic laboratories to work on laboratory samples with high efficiency. A typical work step is carried out by a laboratory instrument on laboratory samples in the protected environment of a working chamber of the laboratory instrument, which provides a protective barrier to the outside. Usually, multiple laboratory instruments are present in a laboratory fulfilling different tasks related to the samples. For running the tasks, the laboratory samples are transported from the treatment site in one working chamber of a first laboratory instrument to the next treatment site inside the working chamber of another laboratory instrument. In order to increase the throughput of such a laboratory, multiple laboratory instruments may be utilized to fulfill equal tasks in parallel, or individual laboratory instruments may also be configured complex enough to perform different tasks inside one working chamber.

High throughput laboratory instruments are often automated to execute different work steps on the laboratory samples with a minimum of user interaction, e.g. by using control data received over the network, and the individual steps of sample treatment are typically controlled by computer programs, software, and robot systems. For this purpose, the laboratory instruments are typically configured to control different internal treatment apparatuses, which are integrated in the laboratory instruments and which represent the basic functionality of the laboratory instrument. For example, an automated pipetting station may include a pipetting robot for measuring and distributing liquids, a mixing device for mixing laboratory samples and a temperature control device for applying one or more temperatures to the laboratory sample, which are accessed and controlled by a control program of the laboratory instrument. While some applications of such laboratory instruments may require to sequentially treat the laboratory samples by each integrated treatment apparatus, other tasks my require only one, or a part of the integrated treatment apparatuses to be used, while the other treatment apparatuses may remain inactive over longer periods.

Laboratory instruments are, moreover, often configured to be network instruments capable of being connected to a network of laboratory instruments. Such a network may comprise laboratory instruments and other network instruments for performing a work step related to the laboratory samples. A data exchange between the network instruments of a laboratory instrument network may be used to send control data to one or more network instruments, to monitor or collect the data generated or forwarded by a network instrument, or to monitor or control a global workflow utilizing multiple network instruments.

It is the object of the present invention to provide the apparatuses required for realizing a network-based workflow on laboratory samples in a flexible and efficient way.

The invention achieves this object by means of the laboratory instrument in accordance with claim 1 and the network instrument in accordance with claim 8. Preferred embodiments of the invention are, in particular, the subject matter of the dependent claims.

The invention allows adapting the type and the number of network instruments according to the needs of a specific network-based workflow in a comfortable way. When planning a workflow, the laboratory instrument according to the invention allows the use of network instruments inside the working chamber of laboratory instruments by simply placing the required number of network instruments inside the working chamber and connecting the second connectors to the first connectors of the connector unit, which faces the inside of the working chamber. Accordingly, those network instruments, which are not required for performing a specific task using the laboratory instrument, may be easily disconnected and removed from the working chamber. Thereby, the assignment of network instruments in a laboratory instrument network can be defined depending on the application, which means that the laboratory hardware can be configured in a flexible manner.

Since a single laboratory instrument may be configured to host several network instruments inside the working chamber, the samples do not have to be transported between different sites. The network instruments can be applied to simultaneously perform a work step related to the samples. Examples of such parallel tasks can be found below.

The capability to exchange the data with the laboratory instrument network, in the inserted position of the network instrument, offers the advantage that any processing of the data, which may be generated by the network instrument inside the working chamber, does not have to take place inside the working chamber, but can be relocated to outside the working chamber, in particular into another network instrument.

When the network instrument is arranged inside the working chamber in a predetermined position, said position is referred to as the inserted position. When the network instrument is connected to the network interface apparatus via the second and first connectors, this position is referred to as connected position. When the network position is in the inserted position and, at the same time, in the connected position, this position is referred to as the installed position.

The working chamber of the laboratory instrument, preferably, comprises at least one compartment and at least one door member, e.g. a hinged door member, which is typically hinged to a border region of the frame, which surrounds the at least one door opening, or a sliding door member, for closing and opening the at least one compartment. Closing and opening the compartment may be a user driven process. Alternatively or additionally, the laboratory instrument may comprise an actuating apparatus, e.g. including an electrical motor, for closing and/or opening the door.

A working chamber, preferably, is formed as a cuboid, in which each of the face sides is a rectangle. A face side may be formed by a wall, which may be substantially planar. However, the working chamber may also have another shape, for example a cylindrical shape. A typical size of such an incubator chamber is between 50 and 400 litres.

Preferably, the working chamber is formed by at least one chamber wall surrounding the inside of the working chamber. Preferably, the working chamber is formed by at least one bottom wall, at least one top wall, at least one rear wall, at least one left side wall, at least one right side wall, and, preferably, at least one front wall. Any of said walls may contain one or more layers of a chamber forming material, wherein said layers may be arranged contacting in a sandwich assembly or may be arranged in a—preferably constant—distance to each other. The walls are connected with each other to provide a—preferably gas-tight—enclosure for the inside of the working chamber. The walls may be connected seamless, e.g. with rounded edges providing a continuous transition of adjacent walls; this way cleaning of the working chamber is facilitated.

The working chamber, preferably, has at least one door opening for allowing the user accessing and equipping the working chamber. The at least one door opening is preferably provided in a front wall of the working chamber.

The material forming the chamber is preferably containing—or made from—a polymer and/or a metal, depending on the basic function of the laboratory instrument. The working chamber, preferably, is made from a metal or comprises a metal surface facing the inner space of the working chamber. Such metal may be a substantially noncorrosive metal, e.g. stainless steel. The material of at least one wall or of each wall may comprise or be composed of metal, in particular stainless steel or copper, or a polymer. In case of the laboratory instrument being a heat applying instrument, e.g. a laboratory incubator, the material is preferably stainless steel or copper, or any other heat conducting material, which preferably withstands a temperature of up to 120° C. or up to 180° C. for at least a predetermined time period T, which may be chosen from the preferred range 30 seconds<=T<=30 minutes. Such temperatures may be used to sterilize the chamber walls.

Preferably, at least one chamber wall comprises a duct for allowing one or more parts to extend through the chamber wall, for providing a passage between the inside of the working chamber and the outside of the working chamber. For example, the duct may be configured to provide a passage for a cable device, which connects the at least one first connector with the communication apparatus. The duct may also be configured to receive and contain a tubular member, which provides a passage between the inside of the working chamber and the outside of the working chamber. Moreover, a closing member for closing the duct may be provided, which may be configured to be manually operated or automatically operated.

The working chamber may contain a holding frame, in particular a rack, for holding one or more shelves, which are placed in parallel to the top and bottom wall of the working chamber, which means horizontally under operating conditions. A shelf is used to increase the storage area available inside the working chamber, for allowing the treatment of a larger number of laboratory samples. The holding frame may be exchangeable from the working chamber. The material of the holding frame may comprise or be composed of metal, in particular stainless steel or copper, or a polymer. In case of the laboratory instrument being a heat applying instrument, e.g. a laboratory incubator, the material is preferably aluminum, stainless steel or copper, or any other heat conducting material, which preferably withstands a temperature of up to 120° C. or up to 180° C. for at least a predetermined time period T, which may be chosen from the preferred range 30 seconds<=T<=30 minutes. Such temperatures may be used when sterilizing the chamber walls. Therefore, the holding frame may be left inside the working chamber during a sterilization process.

The network interface apparatus of a laboratory instrument comprises a connector apparatus, for connecting at least one network instrument with the network interface apparatus. The connector apparatus may comprise one or multiple first connectors, which may be sockets, e.g. basically of the type RJ-45, for connecting one or more data cables, preferably one or more Ethernet cables, preferably a Cat5 or Cat6 Ethernet cables, with the connector apparatus of the network interface apparatus. One end of the data cable may comprise a second connector, e.g. a plug for connecting with the socket of the first connector. Alternatively, the first connector may be a plug and the second connector may be a corresponding socket. Another end of a data cable may be connected or connectable with an—optional—connector apparatus of at least one network instrument, in the installed position, or may be permanently connected with at least one network instrument. At least one first connector, or one first connector, or each first connector, may also be configured to serve as the power supply for the at least one network instrument in the installed position. The electrical current may be transferred via the data cable or a dedicated power line, when the second connector is connected with the first connector for being power supplied.

The laboratory instrument is electrically powered. Therefore, a part of the energy consumption of the laboratory instrument may be distributed to the at least one network instrument in the installed position, when the network instrument is connected with the laboratory instrument for being power supplied. Preferably, the laboratory instrument comprises a power management device for measuring and controlling the electrical power, which is used by the at least one network instrument in the installed position. Thereby, the energy consumption of the at least one network instrument can be controlled and/or the waste heat, emitted by the at least one network instrument into the working chamber can be controlled. The latter is useful, for example, for the laboratory instrument being an incubator or freezer, for example, which require a defined temperature inside the working chamber.

The network interface apparatus of a laboratory instrument comprises two main components, which is the communication apparatus of the network interface apparatus and the connector apparatus. Preferably, the connector apparatus is configured to resist temperatures, e.g. starting from −20° C., −5°, or 0° C., and/or reaching of up to 120° C., or preferably up to 180° C., preferably up to 220° C. for a time period T. In order to achieve this, the connector apparatus is composed solely of materials which are capable to resist such temperatures. In particular, the connector apparatus does not contain any integrated circuits or other electronic components, in particular such electronic components, which are not certified to withstand said temperature stress. Therefore, the connector apparatus does not have to be removed from the working chamber when running a temperature process involving the aforementioned temperatures to be applied inside the working chamber. For example, the connector apparatus will be sterilized at the same time when the working chamber's inside is sterilized by applying a sterilization process involving temperatures of up to 120°, 180° or 220° C. during a time period T. Typically, any inserted network instruments, which may contain temperature sensitive components like ICs, are removed from the working chamber prior to starting such a sterilization process.

Preferably, the network interface apparatus comprises a cable device, which connects the at least one first connector with the communication apparatus of the network interface apparatus. The cable device may contain at least one cable, and may be a bundle of cables, wherein one cable may be connected to each first connector and leading to the communication device. At the communication device and/or at the first connector, the cable end may have an element for realizing a removable electric connection, selected from the group including a plug, a socket, or electrically conducting clamps. Or the cable end may be firmly electrically connected to the first connector and/or the electronics of the communication device.

Preferably the connector apparatus contains at least one channel member, e.g. a tube member, which preferably is configured to pass through at least one duct provided in a chamber wall. Such a channel member may be configured to house the at least one cable of the cable device, which connects the at least one first connector with the communication apparatus, thereby passing through the chamber wall by way of the channel member. The channel member is preferably firmly connected, or is firmly connectable, to the base body of the connector apparatus.

In a preferred embodiment, which is explained more in detail in FIGS. 7a to 7e, the connector apparatus has a housing. The housing, preferably, is configured to protect the electrical contacts and/or plug components of a cable device inside the housing against the conditions inside the working chamber of the laboratory instrument. In a preferred embodiment, the housing is configured to resist and protect the cable contacts against the exposure to a humid environment and/or environment, which is exposed to cleaning and disinfection chemicals, and/or at a large range of temperatures, e.g. starting from −20° C., −5°, or 0° C. to 37° C., and/or reaching of up to 120° C., or preferably up to 180° C., preferably up to 220° C. for a time period T.

Preferably, the housing has a port allowing to connect an electrical plug to complementary plug socket of the cable device inside the housing. Preferably, the electrical contacts inside the housing are displaced from the port towards the inside of the housing, for protecting the contacts against thermal influences, in particular during a possible high-temperature phase inside the working chamber.

Preferably, the housing of the connector apparatus is insertable into the duct, which connects the inside of the working chamber with an area outside the working chamber. Preferably, the housing of the connector apparatus is elastically deformable or has a jacket, which is elastically deformable. Thereby, a sealing is provided for the duct when the housing is located and mounted inside the duct in a mounting position. Moreover, the housing may have a retaining means, which retains the connector apparatus inside the duct in the mounting position. Assuming a virtual axis running along the duct, the elastic property of the housing preferably provides a retaining force in radial direction. Preferably, a flange is located around the port of the housing, which retains the housing at the wall of the working chamber in an axial direction.

Preferably, the elastical housing or the elastical jacket of the housing of the connector apparatus has two or more elastic lamella members, which are preferably disc-shaped and which extend in axial direction for sealing and/or pressing against the duct's inner wall, in the mounting position of the connector apparatus. The air, which is located between two adjacent lamella members, serves as a thermal insulator between the working chamber and the area outside the working chamber.

Preferably, the housing or the jacket of the housing of the connector apparatus extends along a length of the duct in the mounting position, preferably along the full length of the duct, starting inside the working chamber or at an inner wall of the working chamber and ending preferably in an area outside the working chamber. Said length may be between 30 mm and 200 mm, preferably 50 mm and 200 mm. Thereby, the duct can be sealed along the full length in the mounting position of the connector apparatus using the housing.

The elastic material of the housing or jacket is preferably suitable to resist temperatures of between 120° C. and 180° C. for a time period T, T being a time possibly between 30 seconds and five hours, and in particular a time T appropriate to run a disinfection procedure at such temperatures.

In a further preferred embodiment of the connector apparatus, which is explained more in detail in FIGS. 8a to 8c, the connector apparatus is basically a two part device, having a first part serving as a stopper, which is configured for being inserted inside the duct in a mounting position and providing a sealing of the working chamber. The cable device has a plug member, which is configured to be connected with a complementary plug member of a device located inside the working chamber. The plug member and the cable device are arranged movable and capable to be moved through the duct. A flexible cord member has a length suitable to reach from inside the working chamber to an area outside the working chamber, said length being for example between 10 cm and 40 cm. One end of the cord member is firmly connected to the stopper, the other end is firmly connected to the end of the cable device, for example to the plug member at the end of the cable device. The stopper is preferably made from a material suitable to resist temperatures of between 120° C. and 180° C. for a time period T, T being a time possibly between 30 seconds and five hours, and in particular a time T appropriate to run a disinfection procedure at such temperatures. Such a capability for resisting the high temperatures is, on the other hand, not required for the cable device and the plug member of the cable device.

In a first position of such a two-part connector apparatus, the stopper is in the mounted position, the cable device is in the area outside the workings chamber and the flexible cord member extends through the duct, being preferably arranged between the stopper and the duct, and/or being preferably arranged in a recess inside the duct. In the first position, the working chamber may be set to high temperatures, which the stopper can withstand without being damaged. The cable device is not exposed to said temperatures.

For connecting an insertable instrument to the cable device, the user may pull the stopper out of the duct in the direction F towards the inside of the working chamber, thereby pulling the cable device by means of the cord member. Once the plug member of the cable device is located inside the working chamber, the complementary plug of an insertable instrument may be connected and the duct may be closed again using the stopper.

In the second position, the stopper is mounted in the duct, while the cable of the cable device runs through the duct, being preferably arranged between the stopper and the duct, and/or being preferably arranged in a recess inside the duct. Since the stopper is at least in part or fully elastically deformable, the duct is also sealed by the stopper in the second position.

The two-part embodiment of the connector apparatus allows to use an insertable instrument temporarily, without a need to move the laboratory device for accessing the duct, which is often located at a rear wall of a laboratory device. Access to the duct is provided through the working chamber, and a high temperature phase can be used with such a connector apparatus, while protecting the cable device against the high temperatures.

An elastical material, which is suitable to resist temperatures of between 120° C. and 180° C. during a disinfection procedure, as described before, may be a Fluoroelastomer (FKM) or a Perfluoroelastomer (FFKM), or a silicone based material, for example. The laboratory instrument may comprise a base structure, which carries all components of the laboratory instrument, wherein the base structure may comprise support elements for carrying the laboratory instrument at the bottom. The base structure may comprise a carrier frame, which preferably extends from the bottom in vertical direction, under normal operating conditions of the laboratory instrument. In a preferred embodiment, the connector apparatus is configured to mount the working chamber to the carrier frame, in particular by using the at least one channel member as a mechanical connector between the working chamber and the carrier frame. Thereby, a thermal insulation of the working chamber can be achieved, and the formation of a thermal bridge can be avoided. Moreover, a mechanical uncoupling, for dampening vibrations, may be achieved using elastic material between the mechanical connector and the carrier frame.

Preferably, the network interface apparatus, or respectively the connector apparatus, is configured to be releasably mounted at the laboratory instrument facing the inside of the working chamber. Preferably, the network interface apparatus, or respectively the connector apparatus, comprises at least one mounting member for releasably mounting the connector apparatus, in particular its base body, to the laboratory instrument in a mounted position, where, preferably, the connector apparatus is releasably arranged in contact with an inner chamber wall, preferably the rear wall, and where, preferably, the at least one mounting member is passing through the chamber wall, in particular through a duct of the chamber wall. The optional channel members of the network interface apparatus may be used as mounting members. First mounting members and complementary mounting members may be used to fix the connector apparatus into the mounted position by a releasable connection. The first mounting members, e.g. the channel members, may comprise a threaded outer surface, which can be used to engage the inner threads of at least one second mounting member, which may be a threaded ring or nut. Configuring the network interface apparatus as a releasable part allows to unmount the connector apparatus, if needed, or to equip another laboratory apparatus, which does not yet contain a network interface apparatus, with the network interface apparatus to form a laboratory instrument according to the invention.

The network interface apparatus for providing a network connection to the inside of a working chamber in a laboratory instrument is also considered to be an invention, independent from the laboratory instrument.

The system comprising a network interface apparatus and at least one insertable network instrument according to the invention is also considered to be an invention, independent from the laboratory instrument.

The system comprising a laboratory instrument and at least one insertable network instrument according to the invention is also considered to be an invention.

The communication apparatus may include a network adapter, which, preferably, implements the electronic circuitry required to communicate using a specific physical layer and data link layer standard such as Ethernet. The network adapter allows the network instruments to communicate over the laboratory instrument network, either by using cables or wirelessly. The network adapter preferably is both a physical layer and data link layer device, such that it provides physical access to a networking medium and, for example for IEEE 802 and similar laboratory instrument networks, provides a low-level addressing system through the use of physical addresses that are uniquely assigned to network adapters.

Preferably, a communication apparatus includes, or is, a network switch or a network hub. Preferably, the network interface apparatus comprises a network router configured to connect the laboratory instrument network with an external network, preferably the internet.

Preferably, the network interface apparatus is connected or connectable with an optional further communication apparatus of the laboratory instrument for allowing the exchange of the first data between a control apparatus of the laboratory apparatus and the laboratory instrument network.

The connector apparatus includes the at least one first connector for connecting the network instrument to the connector unit, the at least one first connector being arranged facing the inside of the working chamber and being connected with the communication apparatus.

The connector apparatus, preferably, is a single unit, in particular a connector strip, which is mountable along a chamber wall inside the working chamber, in particular at the rear wall of the working chamber. Said chamber wall for mounting the connector apparatus preferably also contains the at least one duct for providing a passage between the inside and outside of the working chamber. In the mounted position of the connector apparatus, the same is preferably arranged above the at least one duct and preferably covers the at least one duct.

The connector apparatus, preferably, contains multiple, i.e. more than one, first connectors, which are preferably arranged in a—preferably constant-distance to each other, and/or which are preferably aligned along an edge of a base body of the connector apparatus. In case that the base body of the connector apparatus is formed as a bar or strip having a straight shape, the multiple first connectors are preferably aligned along a straight line, which may be parallel to an edge of the base body.

The at least one first connector may be mounted in at least one fixed position relative to the base body of the connector apparatus, in particular, each first connector may be fixedly mounted. This may simplify the alignment and match of the second connectors when installing a network instrument inside the working chamber in the installed position.

It is also possible and preferred that the at least one first connector are connected with the base body of the connector apparatus in a movable or removable way, in order to change the relative position of the at least one first connector and the base body. This allows a great flexibility for adapting the position of the second connector and the network instrument.

Preferably, the at least one first connector is a mechanical connector including at least one conductor for providing an Ohmic contact when mechanically contacted by the conductor of at least one second connector in a contacting position.

Preferably, the at least one first connector and/or the at least one second connector is configured to be a blind-mate connector. This may be realized by providing a self-aligning structure or another self-aligning device, which assists for guiding the relative motion of the at least one first connector and the at least one second connector to establish the connected position.

The at least one first connector, in particular each first connector, may comprise a self-aligning structure for guiding the relative position of the at least one first connector and the at least one second connector, when moving the network instrument and/or the at least one second connector in order to establish the installed position. The self-aligning structure may comprise a self-aligning pocket for receiving the second connector, when the same is moved in the direction of the first connector. Said self-aligning pocket may comprise at least one guiding surface for allowing the second connector to slide along the at least one guiding surface until the connected position is established. In case that the second connector is a plug for a socket and the first connector comprises said socket, the plug may slide along the at least one guiding surface in order to match with the socket at the end of the relative motion. The first connector may also comprise a plug and the self-aligning structure, the second connector may comprise a complementary socket. Moreover, it is also possible that the second connector comprises the self-aligning structure. Furthermore, the first and second connectors may both contain a self-aligning structure to act in combination.

Instead of using a plug and a socket, the first and second connectors may be realized using any other type of electric connectors. Such connectors may comprise elastically supported electric contact pins or balls for being pressed against corresponding electric contact surfaces. The force required for the pressing may be provided by the user when establishing the connected position, and the first and second connectors may be held in the connected position by a holding device of the first and/or second connector, which may include clamps, a releasable interlock and or a magnetic force device, which includes a permanent magnet for providing the required holding force.

Preferably, the network instrument includes an alignment apparatus for providing a movable mechanical link between the second connector and the network instrument, e.g. between the second connector and a base part of the network instrument. The movable mechanical link serves for aligning the second connector with a first connector. This is advantageous when the first and second connectors are not yet sufficiently aligned in a first mating position, during the inserting of the network instrument into the inserted position. The movable mechanical link, preferably, is configured to allow a movement of the second connector relative to a base part of the network instrument while the second connector is electrically connected to the control apparatus or the communication apparatus of the network instrument, e.g. by means of a flexible cable. Preferably, the alignment apparatus is configured to allow a relative motion of the second connector and the network instrument, in particular the base part. Said relative motion may be used to assist the blind-mate functionality when establishing the connected position.

For example, it is preferred that the second connector is electrically connected, e.g. permanently electrically connected, to the network instrument, using a flexible cable, and that the second connector is additionally mechanically connected to the network instrument using a path restricting element, which is a part of the alignment apparatus and provides a movability and a restricted guidance to the second connector. The path restricting element is configured to allow the relative movability of the second connector and the network instrument and at the same time restricting the movement with respect to the degrees of freedom. The path restricting element preferably engages with the second connector, for restricting the movement of the second connector to the path provided by the path restricting element.

The path restricting element may be a member providing a slot, a rod or tube, or a contour. For example, the alignment apparatus may contain a slot member containing a slot, which allows a protrusion element, which may be connected or integral to the second connector, to slide along the slot, which acts as a restricted guidance. Alternatively, the alignment apparatus may contain a tubular member or rail member, which allows a runner element, e.g. a sliding element, which may be connected or integral to the second connector, to slide or to roll along the tube or rail, which acts as a restricted guidance. In case that a force component acts on the second connector, which is not perpendicular to the slot, the second connector will be moved under said force component along the slot direction. Such a force component will be produced, for example, when the network instrument is forwarded by the user towards the installed position, and the second connector is forced by a self-aligning structure of the first connector to move along the slot. Preferably, the path of the path restricting element is aligned along a straight direction, preferably the vertical direction, which is the direction of gravity under normal operating conditions of a network instrument inserted into the laboratory instrument.

The alignment apparatus may also include one or more deformable members, in particular elastic members, e.g. springs, to center the second connector in relation to the network instrument in a centered position, e.g. by suspending the second connector at the base part of the network instrument using the deformable member. For example, the second connector may be suspended at the network instrument by a spring, which is positioned in a center position by gravity. Using an elastic member and providing a central position will provide a first mating position of the first and second connectors. The self-aligning structure will then provide the second mating position of the first and second connectors, which is a fine adjustment required for establishing the electrical connection between the first and second connectors.

By reversing the aligning functions of the first and second connectors, it is also possible and preferred that the second connector is mounted non-movable at the network instrument and that the connector apparatus includes a corresponding first connector, which is mounted by means of a alignment apparatus movable along the connector apparatus, which may comprise the alignment apparatus for linking the movable first connector to the connector apparatus and for providing a restricted guidance. Moreover, both, the first and the second connector may be both mounted movable at the connector apparatus and the network instrument, respectively, using an alignment apparatus.

In a preferred embodiment of the laboratory instrument, the working chamber contains an alignment device for guiding the relative motion of the network instrument and the working chamber, when the network instrument is to be inserted into the working chamber and to be forwarded to the installed position. Such an alignment device may be a holding frame for holding at least one network instrument. The holding frame may comprise support members for allowing the network instrument to slide along the support members towards the installed position. The support members are preferably arranged such at the holding frame that the second connector is positioned in the first mating position, and will end up in the second mating position, when being readily installed.

The network instrument for working on laboratory samples is configured to be connected to the network interface apparatus of a laboratory instrument according to the invention for exchanging data. The network instrument comprises a control apparatus for processing the data, a communication apparatus configured to exchange the data between the control apparatus and the network interface apparatus, and at least one second connector configured to be connected to the at least one first connector of the network interface apparatus.

The network interface apparatus, preferably, serves for providing a network connection between the at least one network instrument and a laboratory instrument network. The network connection allows for exchanging data using cables or wireless.

A laboratory instrument network is understood to include a plurality of network instruments, which are connected to exchange data. A network instrument, which is configured to be inserted into the working chamber of the laboratory instrument, is also referred to as insertable network instrument or insertable instrument in the present description of the invention.

Exchanging data includes sending and/or receiving data. The network instrument can be a laboratory instrument, an insertable network instrument or a user interface apparatus, which is network-compatible, for example. Preferably, the laboratory instrument network uses an Ethernet network and/or the network interface apparatus includes an Ethernet hub or an Ethernet switch. Ethernet provides several advantages, like hot-plugging of network instruments to the network, comfortable addressing techniques, easy connection to external networks like the internet due to established standards. Hot plug is the addition of a component to a running computer system with-out significant interruption to the operation of the system. Hot plugging a device does not require a restart of the system. An Ethernet network, in terms of the present invention, describes a network, which uses at least the physical layer, also generally described as OSI (Open Systems Interconnection) model layer 1, and preferably also the data layer, also generally described as OSI model layer 2, implemented by Ethernet technology, as it is generally known from the industry norm IEEE-Norm 802.3. Preferably, the internet protocol (IP) is implemented as network layer, i.e. OSI model layer 3, to provide e.g. logical addressing.

The laboratory instrument according to the invention, preferably, is a network instrument for working on laboratory samples using a data exchange within a laboratory instrument network. In order to be network-compatible, the laboratory instrument preferably comprises a further communication apparatus for providing the network connection. A user interface apparatus, being a network instrument, may be part of the laboratory instrument network. The user interface apparatus may be a stand-alone network instrument, i.e. a device that is self-contained, and that does not require any other devices to function. In another embodiment, the user interface apparatus may be mechanically connected to a laboratory instrument, preferably being releasably connected, e.g. by a fixation mechanism, to form an exchangeable module of the laboratory instrument. The user interface apparatus may be integrated in a laboratory instrument, thereby forming a part of the same. In case that the user interface apparatus is mechanically connected or integrated in a laboratory instrument, the user interface apparatus may contain the control apparatus of the laboratory instrument and/or may contain the communication apparatus of the laboratory instrument. A number of network instruments may be network instruments of the same laboratory instrument network.

The user interface apparatus, preferably, comprises the communication apparatus of the laboratory instrument.

In a typical scenario for implementing a workflow related to the work on laboratory samples, a number of the network instruments of the laboratory instrument network is accessed by a user interface apparatus being also a network instrument of the laboratory instrument network. The user interface apparatus may be used by a first user, for example, to plan and/or schedule a global work process for processing the laboratory samples, which are processed using the number of network instruments, including one or more laboratory instruments and one or more insertable network instruments. The first data may contain information on the availability of the overall network instruments. For example, a number of laboratory instruments may be occupied by the currently running working process initiated by a second user, which means that the respective laboratory instruments may be unavailable, at least temporarily. The data to be exchanged during the workflow of scheduling may contain information on the availability of the network instruments with regard to a time schedule and/or any resource information, e.g. a maintenance status, the supply with consumables required for a network instrument, e.g. pipettes, containers, sample media, solutions, chemicals, etc.

Moreover, the laboratory instrument preferably comprises a treatment apparatus for performing a treatment of the laboratory samples housed in the working chamber. The treatment performed by the treatment apparatus of a laboratory instrument may involve the exchange of first data within the laboratory instrument network. The first data may be used in combination with the data exchanged with the inserted network instruments to implement a network-based workflow. Hereby, the first data may define parameters or program parameters for performing an instrument-controlled treatment. For example, the laboratory instrument may utilize first data, which define the steps of a treatment, which is to be performed by the respective treatment apparatus during the instrument-controlled treatment. Such steps may include the automatic pipetting, and/or temperature adjustment, and/or mixing, and/or magnetic separation, and/or centrifugation, and/or irradiation, in particular with UV light, and/or illumination, and/or physical or chemical analysis of the laboratory samples. The first data may also contain information on physical parameters which characterize the treatment of the laboratory samples, e.g. physical parameters characterizing the atmosphere inside a working chamber. Such physical parameters may include the temperature inside the working chamber, in case that the laboratory instrument is an incubator, or a cooling device like a fridge or freezer, or the humidity and/or $CO_2$ content, which may be relevant for an incubator.

The connector apparatus of the network interface apparatus is typically arranged in contact with or integrated into a chamber wall of the working chamber, preferably the rear wall of the working chamber, which opposes the front wall. Further preferred, the connector apparatus is arranged in contact with or integrated into the front wall of the working chamber, or a side wall.

It is also possible and preferred that the second data are exchanged between the network interface apparatus of the laboratory instrument and the at least one insertable network instrument by a wireless technique, e.g. by radio transmission or optical data exchange. The network interface apparatus may be configured to provide a wireless local area network (WLAN) inside the working chamber. In this case, the insertable network instrument preferably has a wireless network adapter, which may be part of a communication apparatus of the insertable network instrument.

Preferably, the laboratory instrument is configured for locating the presence or absence, and/or at least one position of the at least one insertable network instrument, in the inserted position. Therefore, the network interface apparatus preferably is a network switch, in particular an Ethernet switch. The network switch provides the information, which network instrument, in particular which insertable network instrument, is connected to a specific port of the network switch. Using the predetermined information on the geographic position of a port placed along the network interface adapter, the latter being preferably placed inside the working chamber in a predetermined arrangement, allows to obtain a correlation between a specific network device, which may be identified via its physical address, and the geographic position of the same.

Preferably, the laboratory instrument is configured to determine position data representing the relative position inside the working chamber of the laboratory instrument, preferably including operating an Ethernet switch using an Serial Peripheral Interface, Simple Network Management Protocol, or Tail Tagging—in particular as provided by a Micrel® Ethernet switch.

The insertable network instrument is to be inserted into the working chamber, in an inserted position, and is configured to perform a work step related to the laboratory samples involving the exchange of second data within the laboratory instrument network.

Preferably, the insertable network instrument comprises a second control apparatus for processing the second data and/or for controlling the work step, and/or a measurement device and/or a working apparatus to perform the work step related to the laboratory samples, and/or a second communication apparatus configured to exchange, in the inserted position, the second data between the second control apparatus and the laboratory instrument network. The second communication apparatus may be a part or be implemented by the control apparatus, which may include integrated circuits.

The insertable network instrument is configured to generate and/or store and/or send/receive the second data. Preferably, the insertable network instrument is a program controlled instrument. For the purpose of unambiguously identifying the insertable network instrument in the laboratory network, it is preferred that the insertable network instrument has an identifying property, e.g. an identifying code, which can be included in the second data, at least on demand. The identifying code may be a unique physical address, e.g. a media access control address (MAC address), which is a unique identifier assigned to network interfaces for communications on the physical network segment.

The insertable network instrument, preferably, has a connector apparatus for connecting the insertable network instrument with the network interface apparatus of the laboratory instrument. The connector apparatus may comprise one or more plugs or sockets to provide said connection using a cable. The connector apparatus may comprise one or more cables for providing said connection. Alternatively or additionally, the connector apparatus may be, or include, a wireless network adapter for implementing a wireless exchange of the second data.

The insertable network instrument may contain a battery for powering the functions of the insertable network instrument, including the operation of any possible measurement device and/or working apparatus, and/or the second control apparatus and/or the second communication apparatus.

The insertable network instrument, preferably, has at least one measurement device, which is configured to measure at least one measurement parameter inside the working chamber, thereby performing the work step of measuring. For this purpose, the measurement device may include at least one sensor for measuring the measurement parameter. Preferably, the insertable network instrument is a measurement device. The at least one measurement parameter may be used by the insertable network instrument to form the second data. The measurement parameter, preferably, may characterize the at least one laboratory sample placed inside the working chamber, and/or characterize the working chamber or the atmosphere inside the working chamber, e.g. the temperature of a wall of the working chamber or the temperature of the atmosphere, the humidity, the concentration of a gas, e.g. $CO_2$, inside the working chamber.

The measurement parameter may characterize a physical property of one or more laboratory samples, e.g. a sample temperature, volume, emitted or transmitted light intensity, the pH-value.

In a preferred embodiment, the measurement device comprises a camera, in particular a CCD or CMOS camera. In this case, the second data are picture or movie data, which are provided to the laboratory instrument network for the further evaluation. The camera may comprise an optical system focusing on a target area. The optical system may be a microscopic system. It may have a fixed focus or a variable focus. Such an optical measurement device may be used to monitor the growth of living cells or bacteria, in particular for the purpose of a quantitative evaluation of the picture data, e.g. by particle or cell counting, and/or volume determination of the particles or cells.

In a preferred embodiment, the insertable network instrument is an optical camera instrument, comprising the optical measurement device.

Preferably, the insertable network instrument is a carrier device for carrying at least one laboratory sample, and the working chamber is configured to receive the at least one carrier device. The carrier device may be a drawer for being pushed and pulled into/out of the working chamber, a frame for holding sample containers and/or other laboratory equipment, in particular a frame for roller bottles. Preferably, the carrier device is a shelf having a shelf surface to be horizontally arranged and mounted in the working chamber.

In a preferred embodiment, the insertable network instrument is a shelf, which can be inserted into the working chamber to act as a support for the laboratory samples and, preferably, for other sample processing equipment and/or devices. Preferably, the shelf includes at least one measurement device, which is permanently mounted to the shelf or connectable to the shelf, and which may generate the second data. The shelf may include the second communication apparatus. Moreover, the shelf may include a working apparatus, which is configured to perform a work step related to the laboratory samples involving the exchange of second data within the laboratory instrument network. The shelf may also comprise a second network interface apparatus, e.g. a network switch or hub, for allowing additional insertable network instrument is to be connected to the laboratory instrument network via the second network interface apparatus.

A working apparatus of an insertable network instrument, in particular a shelf, may comprise a movement mechanism for generating the motion of a moving part inside the working chamber. Generating the movement is the work step performed by the insertable network instrument, in this case. The movement mechanism may include an electric motor. Such a movement mechanism can be or comprise a rotor for moving and/or heating and/or cooling a stream of fluid inside the working chamber using, e.g., a rotor as the moving part. For example, a ventilator may be provided to move air, or a pump may be provided to move liquid. Moreover, a movement mechanism may be or include a drive mechanism for generating the oscillation motion of a movable platform, which may be a support platform for carrying the laboratory samples. Such an oscillating platform can be used for mixing sample solutions or shaking laboratory samples. The drive mechanism may include electromagnetic coils for generating a driving force. Moreover, a movement mechanism may be or include a magnetic drive mechanism for rotating a magnetic stir bar, which may be arranged by a user in a sample container containing also the laboratory sample to be stirred.

A working apparatus, in particular a movement mechanism, may be controlled by the control apparatus of the insertable network instrument. The second data, involved in the operation of a working apparatus, in particular of a movement mechanism, may include the control data for controlling the working apparatus, in particular for controlling a driving voltage, current or power output. The second control device may be configured to measure the power demand of the working apparatus. The information on the power demand may be provided as the second data.

The insertable network instrument, or respectively the second control apparatus, may include a data processing unit and/or a data storage device for storing the second data.

The second communication device, preferably, is configured to receive the second data from the data storage device and provide the second data to the laboratory instrument network, which means to any network instrument connected to the laboratory instrument network.

A working apparatus may also contain a lamp for irradiating at least a part of the working chamber, in particular with UV-light, which is useful for the sterilization of the working chamber, or for irradiating one or more other insertable network instrument s, which are inserted inside the working chamber. A working apparatus may also contain a lamp for illuminating at least a part of the working chamber, in particular illuminating the laboratory samples. The illumination may be used to initiate or catalyze photoactive chemical processes inside the laboratory samples, to provide the light required for optically measuring or monitoring the laboratory samples, or to change the temperature of one or more laboratory samples by absorption of the light energy and transforming the same to heat.

Preferably, the insertable network instrument is a calibration device for assisting the calibration of one or more parameters of the laboratory instrument, in particular a parameter for operating the treatment apparatus of the laboratory instrument. For example, the treatment apparatus of the laboratory instrument, which may be a freezer or incubator, for example, may be configured to provide at least a predetermined or user defined temperature within the working chamber. This is usually achieved by one or more control loop system associated to the control apparatus of the laboratory instrument. A control loop system may be an open loop control system or an closed loop control system, the latter also called a feedback control system. In a feedback control system, a control loop, including one or more sensors, one or more control algorithms and one or more actuators, is arranged in such a way as to try to regulate a variable at a setpoint or reference value. For implementing a temperature adjustment as a treatment of the laboratory samples, the actuator of the feedback control system is a temperature adjusting device, e.g. a heating and/or cooling device, e.g. a Peltier device, and the sensor is a temperature sensor placed in thermal contact with the inside of the working chamber. The preciseness of the sensor will influence the performance of the laboratory instrument. Therefore, calibration is used, typically by a maintenance technician, to compensate for any errors or drifts of the sensor performance. The insertable network instrument, being a calibration device, preferably contains a sensor, which is more reliable and precise than the sensor used inside the control loop system of the control apparatus of the laboratory system. Such a solution is efficient, because one calibration device can be used on time, when required, and can be used for different laboratory instruments.

The invention is also related to the laboratory instrument network comprising at least one network instrument, in particular at least one laboratory instrument according to the invention and/or the at least one insertable network instrument, which is configured to be inserted into the working chamber of the laboratory instrument according to the invention and be removed from said working chamber, and which is configured to perform the work step related to the laboratory samples using the second data exchanged within the laboratory instrument network, wherein the at least one laboratory instrument and the at least one insertable network instrument are connected by way of the laboratory instrument network to enable the exchange of data, in particular the first and/or second data, in the inserted position of the at least one insertable network instrument. Preferably, the laboratory instrument network uses an Ethernet network.

Preferably, the laboratory instrument network, in particular the network interface apparatus, comprises a network router to connect the laboratory instrument network to an external network, preferably the internet.

Preferably, the laboratory instrument network is configured, for the purpose of addressing a network instrument, in particular a laboratory instrument or an insertable network instrument, to have a link-local address be assigned to each network instrument, which is connected to the laboratory instrument network, the link-local address preferably being a link-local IP address of an Ethernet network.

Preferably, the laboratory instrument network contains a network router and a network switch, which are configured to implement at least one Virtual Local Area Network (VLAN), in particular one internal VLAN, which connects the network instruments, in particular the at least one laboratory instrument and/or the at least one insertable network instrument, and, preferably, one external VLAN, which hides the network instruments connected by the internal VLAN against an external network, e.g. the internet, and which connects the laboratory instrument network with the external network to enable data exchange.

The invention is also related to a method for working on laboratory samples using a laboratory instrument network comprising at least one laboratory instrument according to the invention and at least one insertable network instrument, which is configured to perform a work step related to the laboratory samples involving the exchange of second data within the laboratory instrument network, including the steps: —placing at least one insertable network instrument in the working chamber of the at least one laboratory instrument; —connecting the at least one insertable network instrument with the network interface apparatus of the at least one laboratory instrument to enable the data exchange between the at least one insertable network instrument and the laboratory instrument network. Further optional and preferred embodiments of the method according to the invention may be derived from the description of the laboratory instrument according to the invention and the laboratory instrument network, including their respective preferred embodiments.

The term laboratory instrument denotes, in particular, an instrument which is embodied for instrument-controlled treatment of at least one laboratory sample and which is embodied for use in a laboratory. This laboratory can be, in particular, a chemical, biological, biochemical, medical or forensic laboratory. Such laboratories serve for research and/or analysing laboratory samples, but can also serve for the manufacture of products by means of laboratory samples or the manufacture of laboratory samples.

A laboratory instrument is preferably one of the following laboratory instruments and/or is preferably embodied as at least one of the following laboratory instruments: a laboratory incubator, also referred to as "incubator" within the scope of the description of the present invention; a laboratory freezer, also referred to as "freezer" within the scope of the description of the present invention; a thermocycler, also referred to as "cycler" within the scope of the description of the present invention; a laboratory sample shaker, also referred to as "shaker" within the scope of the description of the present invention; a laboratory mixer, also referred to as "mixing device"; a laboratory machine for treating fluid samples, in particular a pipetting machine.

In a preferred embodiment of the invention, the laboratory instrument is a laboratory incubator. A laboratory incubator is an instrument by means of which controlled climatic conditions for various biological development and growth processes can be set up and maintained. It serves to set up and maintain a microclimate with regulated gas and/or humidity and/or temperature conditions in an incubator space, wherein this treatment may be dependent on time.

The laboratory incubator is not, in terms of the present invention, a neonate incubator, i.e. an apparatus used to maintain environmental conditions suitable for a neonate. Neonate incubators are related to a different technical field, which is not related to the present invention.

The laboratory incubator, in particular the treatment apparatus of the laboratory incubator, may, in particular, comprise a timer, in particular a timer switch, and/or a heater/cooling apparatus and preferably a setting for regulating a substitute gas supplied to the incubator space, in particular fresh air, and/or a setting apparatus for the composition of the gas in the incubator space of the laboratory incubator, in particular for setting the $CO_2$ and/or $O_2$ content of the gas and/or a setting apparatus for setting the humidity in the incubator space of the laboratory incubator.

The laboratory incubator, in particular the treatment apparatus of the laboratory incubator, comprises, in particular, at least one incubator chamber forming the at least one working chamber of the incubator, furthermore preferably a control apparatus with at least one control loop, to which at least one heater/cooling apparatus is assigned as an actuator and at least one temperature measurement apparatus is assigned as a measurement member. The temperature can be regulated in the incubator by means of the controlling system.

$CO_2$ incubators serve, in particular, for cultivating animal or human cells. Incubators may have turning devices for turning the at least one laboratory sample and/or a shaker apparatus for shaking or moving the at least one laboratory sample.

The instrument-controlled treatment of the at least one laboratory sample may correspond to a climate treatment in a laboratory incubator, with at least one sample being subjected to said treatment. Preferably, first data, including parameters, in particular program parameters, in particular user parameters, which are used to influence a climate treatment, define, in particular, the temperature of the incubator space, in which the at least one sample is incubated, the $O_2$ and/or $CO_2$ partial pressure in the incubator interior, the humidity in the incubator interior and/or at least one progress parameter, which influences or defines the progress, in particular the sequence, of a incubation treatment program consisting of a plurality of steps.

A working chamber, here an incubator chamber, typically, is formed by a cuboid, in which each of the face sides is a rectangle. However, the working chamber may also have a substantial cylindrical, oval, or spherical shape. Typically, the front lateral face sides provides at least one opening, which can be closed by at least one door panel, which is typically hinged to a border region of the frame, which surrounds the at least one opening. A typical size of such an incubator chamber is between 50 and 400 litres.

In a preferred embodiment, the insertable network instrument of a laboratory incubator according to the invention is a carrier device, in particular a shelf.

The network interface apparatus of an incubator preferably comprises the connector apparatus, for connecting at least one insertable network instrument with the communication apparatus of the network interface apparatus. The connector apparatus is typically arranged in contact with or integrated into a side wall of the working chamber, preferably the rear wall of the working chamber, which opposes the front wall. Further preferred, the connector apparatus is arranged in contact with or integrated into the front wall of the working chamber, or a lateral side wall.

A laboratory freezer serves for storing at least one laboratory sample in a freezer room at regulated temperatures, in particular in the freezer range from −18° C. to −50° C. or in the ultra-freezer range from −50° C. to −90° C. In particular, a laboratory freezer is not a refrigerator, which can be used for cooling at temperatures in the range from 0° C. to 10° C. or from −10° to 10° C. in particular.

A laboratory freezer, in particular the treatment apparatus of the laboratory freezer, comprises, in particular, at least one cooling apparatus and at least one regulation apparatus with at least one control loop, to which the at least one cooling apparatus is assigned as an actuator and at least one temperature measurement apparatus is assigned as a measurement member.

A laboratory freezer, in particular the treatment apparatus of the laboratory freezer, comprises, in particular, a monitoring measurement instrument for measuring the temperature and/or in particular at least one alarm apparatus, by means of which an alarm signal is emitted if the temperature measured in the freezer space departs from a permitted temperature range.

A laboratory freezer, in particular the treatment apparatus of the laboratory freezer, can, in particular, comprise an information reader for reading information. This information can be contained in an information medium which can be connected to an article. This article can, in particular, be a sample container which can contain at least one laboratory sample. The information medium can, in particular, comprise an RFID chip or other identification features, such as e.g. a barcode, a data matrix code, a QR code, which can be read by suitable methods.

The instrument-controlled treatment of the at least one laboratory sample corresponds to a low-temperature treatment in a laboratory freezer, with at least one sample being subjected to said treatment. Possible parameters, in particular program parameters, in particular user parameters, which are used to influence a low-temperature treatment, define, in particular, the temperature of the freezer space, in which the at least one sample is frozen and/or the information read process, which is preferably carried out when an article provided with an information medium is transferred from a user into the laboratory freezer. Such parameters may form or may be included in the first data.

The working chamber of a laboratory freezer is, preferably, the freezer room; the insertable network instrument, preferably, is a carrier device, in particular a shelf.

A thermocycler is an instrument that is able, successively in time, to set the temperature of at least one sample to a predetermined temperature and to keep said sample at this temperature level for a predetermined duration. The progress of this temperature control is cyclical. That is to say, a predetermined temperature cycle, i.e. a sequence of at least two temperature levels, is carried out repeatedly. This method serves, in particular, for performing a polymerase chain reaction (PCR). In this context, a thermocycler is sometimes also referred to as a PCR block.

A thermocycler, in particular the treatment apparatus of the thermocycler, preferably has a thermoblock. A thermoblock is a sample holder made of a heat-conducting material, usually a metal-containing material or a metal, in particular aluminium or silver. The sample holder comprises a contacting side which is contacted by at least one heater/cooling apparatus of the thermocycler, in particular by a Peltier element.

The thermocycler, in particular the treatment apparatus of the thermocycler, comprises a regulation apparatus with at least one control loop, to which the at least one heater/cooling apparatus is assigned as an actuator and at least one temperature measurement apparatus is assigned as a measurement member. The temperature is regulated to a temperature level by means of the controlling system. A cooling body of the thermocycler, in particular of the treatment apparatus of the thermocycler, serves for cooling sections of the thermocycler, in particular for cooling the Peltier elements. The thermocycler, in particular the treatment apparatus of the thermocycler, may comprise further heater and/or cooling elements.

The thermocycler, in particular the treatment apparatus of the thermocycler, preferably comprises a timer apparatus, by means of which time parameters for setting the temperature cycle can be controlled. The instrument-controlled treatment of the at least one laboratory sample corresponds to a temperature cycle treatment in a thermocycler, with at least one sample being subjected to said rotational treatment. Possible parameters, in particular program parameters, in particular user parameters, which are used to influence a temperature cycle treatment, define, in particular, the temperature of a temperature level, the duration of a temperature level, the control of further heater and/or cooling elements and/or the number of temperature levels or cycles and/or at least one progress parameter, which influences or defines the progress, in particular the sequence, of a temperature monitoring program consisting of a plurality of steps. Said parameters may form, or may be included in, the first data.

A thermocycler includes a movable cover for covering the thermoblock, including the laboratory samples, inside a covered space, in the closed position of the cover, thereby protecting the space against external interferences, which may result, e.g., in temperature disturbances or sample contamination. The insertable network instrument may be a thermoblock, which is removable from the working chamber formed by the covered space, in the opened position of the cover.

A laboratory shaker serves for moving a laboratory sample, in particular for mixing a laboratory sample comprising a plurality of constituents. There are different embodiments of laboratory shakers, in particular overhead shakers or flatbed shakers. Laboratory shakers can comprise a temperature control function for controlling the temperature of at least one laboratory sample and can, in particular, comprise an incubator function for incubating the at least one laboratory sample in controlled climatic conditions. Laboratory shakers, in particular the treatment apparatus thereof, can, in particular, be configured to perform an oscillating motion on a sample container holder, e.g. a supporting platform or sample rack.

Laboratory shakers, in particular the treatment apparatus thereof, comprise, in particular, a drive for driving the motion, comprise, in particular, a timer apparatus, by means of which time parameters of the setting of the shaker treatment can be controlled and, in particular, comprise at least one heater/cooling apparatus and at least one control apparatus with at least one control loop, which is assigned the at least one heater/cooling apparatus as actuator and at least one temperature measurement apparatus as measurement member. The instrument-controlled treatment of the at least one laboratory sample corresponds to a shaker treatment in a laboratory shaker, with at least one sample being subjected to said treatment. Possible parameters, in particular program parameters, in particular user parameters, which are used to influence a shaker treatment, define, in particular, the movement intensity, in particular the movement frequency in the case of an oscillating drive, of a time period during the shaker treatment and/or at least one progress parameter, which influences or defines the progress, in particular the sequence, of a shaker treatment program consisting of a plurality of steps. Said parameters may form, or may be included in, the first data. Laboratory shakers include a working chamber for housing the laboratory samples. The insertable network instrument of a laboratory shaker may be a carrier device.

A laboratory mixer, also referred to as "mixing device", serves like the laboratory shaker for moving a laboratory sample, in particular for mixing a laboratory sample comprising a plurality of constituents. Compared to a laboratory shaker, a laboratory mixer enables movements with higher frequencies, in particular with higher rotational speeds. Laboratory mixers, in particular the treatment apparatus thereof, can, in particular, be configured to perform an oscillating motion on a sample container holder, e.g. a supporting platform or sample rack.

Laboratory mixers, in particular the treatment apparatus thereof, comprise, in particular, a drive for driving the motion, comprise, in particular, a timer apparatus, by means of which time parameters of the setting of the mixer treatment can be controlled and, in particular, comprise at least one heater/cooling apparatus and at least one control apparatus with at least one control loop, which is assigned the at least one heater/cooling apparatus as actuator and at least one temperature measurement apparatus as measurement member. The instrument-controlled treatment of the at least one laboratory sample corresponds to a mixer treatment in a laboratory mixer, with at least one sample being subjected to said treatment. Possible parameters, in particular program parameters, in particular user parameters, which are used to influence a mixer treatment, define, in particular, the movement intensity, in particular the movement frequency in the case of an oscillating drive, of a time period during the mixer treatment and/or at least one progress parameter, which influences or defines the progress, in particular the sequence, of a mixer treatment program consisting of a plurality of steps. Said parameters may form, or may be included in, the first data. Laboratory mixers include a working chamber for housing the laboratory samples. The insertable network instrument of a laboratory shaker may be a carrier device.

A laboratory machine for treating fluid samples, in particular an automated pipetting apparatus, serves for the program-controlled treatment of these samples. A laboratory machine can be a laboratory instrument or comprise at least one laboratory instrument of the aforementioned type and/or can be embodied to carry out at least one, some or all of the treatments that can be executed by this aforementioned laboratory instrument.

A laboratory machine comprises the treatment apparatus for automatic, program-controlled treatment of the at least one laboratory sample, wherein the treatment is controlled by using a plurality of program parameters, which are at least partly selected by the user. In the process, the sample can, for example, be moved and/or transported by the laboratory machine or a treatment apparatus of the laboratory machine. The movement can be brought about by transport in movable sample containers or by guidance through tube systems, capillaries or pipette tips. Here, liquid samples are, in particular, transported by suction, i.e. by pipetting, or, more generally, by the application of pressure differences.

By way of example, a sample can be divided or diluted by a treatment of the sample. The contents of a sample can be analysed or it is possible, e.g. by way of a chemical reaction, for new contents to be produced, in particular by using the sample. In the context of, in particular, handling and analysing DNA or RNA or the constituents thereof, laboratory machines aid in obtaining a wealth of information within a suitable period of time or in analysing many such samples. This treatment apparatus of a laboratory machine usually comprises a worktop with workstations, on which samples can be handled or stored in various ways.

For the purposes of transporting e.g. liquid samples between various positions, in particular sample containers, the treatment apparatus usually comprises an instrument-controlled movement device and an instrument-controlled fluid-transfer apparatus, which can e.g. comprise a pipetting system. Both the transport of the samples and the treatment thereof at the various stations can be carried out in an instrument-controlled manner, in particular in a program-controlled manner. Then the treatment is preferably at least partly or completely automated. Any parameters required for the sample treatment may form, or may be included in, the first data. Laboratory machines include a working chamber for housing the laboratory samples. The insertable network instrument of a laboratory shaker may be a carrier device, in particular a shelf.

The laboratory machine can be modified in such a way that it can be used to perform further treatment types. This can be brought about by virtue of the files and/or programs or program constituents required for this, in particular a program module mapped to the treatment type, being subsequently transmitted to the laboratory machine, in particular the storage apparatus thereof.

A laboratory sample is a sample which can be treated in a laboratory. Instead of the term laboratory sample, the term "sample" is also used in the description of the invention. The sample can be a fluid. The sample can be liquid, gel-like, powdery or a solid-state body or comprise such phases. The sample can be a mixture of such phases, in particular a liquid mixture, a solution, a suspension, e.g. a cell suspension, an emulsion or dispersion. A solution is a homogeneous mixture of at least two substances. A liquid sample can be of a type which is usually handled in a biological, chemical or medical laboratory. A liquid sample can be an analysis sample, a reagent, a medium, a buffer etc. A solution has one or more dissolved solid, liquid or gaseous substances (solutes) and furthermore comprises a preferably liquid solvent which, in particular, forms the greater portion or greatest portion of the volume which forms the solution. The solvent may itself be a solution.

A sample container can be an individual container, in which only a single sample is contained, or it can be a multiple container, in which a plurality of individual containers connected to one another are disposed.

A single container can be an open container or a sealable container. In the case of a sealable container, provision can be made for a covering element, in particular a sealing cap. The covering element can be securely connected to the container, e.g. as a hinged cover or hinged closure cap, or can be used as separate component.

In a multiple container, the plurality of single containers are preferably disposed in a fixed position with respect to one another, in particular in accordance with the crossing points of a grid pattern. This simplifies the automated approach to the positions and, in particular, the individual addressing of samples. A multiple container can be embodied as plate element, in which the individual containers are connected in such a way that they form a plate-shaped arrangement. The individual containers can be embodied as depressions in a plate or can be interconnected by web elements. The plate element can have a frame element, in which the single containers are held. These connections between components can be integral connections, i.e. cohesive connections and/or connections generated by a common injection moulding process, or they can be generated in a force-fit and/or form-fit manner. In particular, the plate element can be a microtiter plate.

Multiple containers can comprise a plurality (2 to 10) of single containers. They can furthermore comprise a multiplicity (more than 10) thereof, typically 12, 16, 24, 32, 48, 64, 96, 384, 1536 single containers. In particular, the multiple container can be a microtiter plate. A microtiter plate can be embodied in accordance with one or more industrial standards, in particular the industrial standards ANSI/SBS 1-2004, ANSI/SBS 2-2004, ANSI/SBS 3-2004, ANSI/SBS 4-2004.

The maximum sample volume that can be held by a transport container or sample container typically lies between 0.01 ml and 100 ml, in particular 10-100 µl, 100-500 µl, 0.5-5 ml, 5-25 ml, 25-50 ml, 50-100 ml, depending on the type of selected transport container or sample vessel.

The treatment of one or more laboratory samples, or a work step related to one or more laboratory samples, can contain one or more of the processes specified below, in particular simultaneously or in succession:

transport of the laboratory sample, in particular by a transport apparatus, under the action of gravity and/or a force caused by the laboratory machine;
   a contactless (non-invasive) physical treatment of the sample, in particular a thermal treatment, in particular heating and/or cooling, in particular controlling the temperature of the sample; or freezing or defrosting of the sample or a different thermal induction of a phase change of the sample, e.g. evaporation, condensation, etc.; a magnetic treatment of the sample; an optical treatment of the sample, in particular irradiating the sample with radiation, in particular light, in particular visible light, infrared light or UV light or detection of such radiation, in particular fluorescence light, from this sample; a magnetic treatment of a sample with magnetic constituents, in particular magnetic separation of magnetic constituents, in particular "magnetic beads", from a liquid phase of the sample; moving the sample, i.e. performing a mechanical treatment of the sample, in particular shaking, rotating, oscillating, vibrating, centrifuging, an acoustic treatment, in particular with ultra-sound, in each case e.g. for the purpose of mixing the sample or of separating constituents within the sample or of transporting the magnetic constituents out of the sample or into the sample;

invasive physical treatment of the sample, i.e. performing a mechanical treatment of the sample: introducing stirring tools, e.g. stirring bar or magnetic stirrer bar, into the sample and stirring, introducing a sonotrode for acoustic or ultrasonic treatment, introducing transport means, in particular transport containers, into the sample, e.g. dispenser tip or pipette tip or hollow needle or tube; adding other auxiliary means into the sample;

chemical, biochemical or biomedical treatment of the sample: adding chemical (e.g. reactant, reagent, solvent, solute), biochemical (e.g. biochemical macromolecules, e.g. DNA, DNA constituents; pharmaceutical active ingredients) or biomedical (blood, serum, cell medium) substances;

storing the sample, in particular for a period of time defined in a program-controlled manner, in particular under specific physical conditions, e.g. at a specific temperature, temperatures or temperature changes, in particular repeated temperature changes, e.g. cyclically and/or periodically repeated temperature changes and/or setting a surrounding pressure, e.g. applying positive pressure or negative pressure, in particular a vacuum, and/or setting a defined surrounding atmosphere, e.g. a protective gas or a specific humidity, under specific radiation conditions, e.g. shielded against visible light, in the dark or under defined irradiation;

measuring or analysing the sample, in particular analysing by means of a non-invasive and/or invasive treatment of the sample, in particular in order to measure at least one or more chemical, physical, biochemical and/or medical properties of the sample, in particular counting of cells by means of a cell counter;

handling of the sample, in particular changing at least one property of the sample, in particular by means of non-invasive and/or invasive treatment of the sample.

This treatment is, in particular, under program control, using at least one program parameter.

In particular, this treatment is brought about in accordance with at least one control parameter which determines the treatment of the laboratory sample by means of the treatment apparatus. A control parameter can set a period of time, a moment in time, a specific sample volume and/or metering volume, a specific sample temperature, etc. A control parameter can relate to the automatic use of a specific transport head, a specific type of transport container, a specific type of sample container, one or more individual samples or of specific positions of these components in the workspace. A control parameter can relate to the treatment of an individual sample or the treatment of a plurality or multiplicity of samples.

A user can establish the exchange of first data with a laboratory instrument by means of a user interface apparatus, for the purpose of inputing first data or retrieving first data from the laboratory instrument. Every user may use the same user interface apparatus, or a plurality of users can establish a first data connection with the laboratory instrument by means of different user interface apparatuses. A user interface apparatus can be a component of a laboratory instrument. A user interface apparatus can be a component of a control apparatus of the laboratory instrument, in particular the first control apparatus.

A user interface apparatus preferably comprises in each case: a control apparatus for a user interface apparatus, also referred to as the third control apparatus; a communication apparatus of the user interface apparatus, also referred to as the third communication apparatus, for establishing a data connection to the laboratory instrument by means of an connector apparatus of same; an input apparatus for acquiring user inputs of a user; an output apparatus, in particular an indication unit and/or a display, for outputting information to the user. Here, the control apparatus of the user interface apparatus is preferably configured to interchange data with the laboratory instrument via the first data connection.

The term "instrument-controlled treatment" means that the treatment of the at least one laboratory sample is at least partly controlled, in particular performed, by the laboratory instrument. To the extent that the treatment is controlled and/or carried out by the laboratory instrument, said treatment in this respect is, in particular, not controlled and/or performed by the user, in particular not controlled and/or performed manually by the user.

An instrument-controlled treatment is furthermore preferably understood to mean that the treatment is at least partly controlled, in particular performed, by the laboratory instrument as a function of at least one user input. The user input may occur prior to the start of the treatment and/or during the treatment. The user input preferably occurs using a user interface apparatus, which is preferably a component of the laboratory instrument or which is provided separately from the laboratory instrument and signal connected to the control apparatus of the laboratory instrument and/or to the control apparatus of the access control device. The user input serves, in particular, for entering at least one parameter, the value of which influences and/or controls the treatment. This parameter can, in particular, be a program parameter.

The "instrument-controlled treatment" denotes, in particular, the at least partly automated treatment. In the case of a partly automated treatment, it is possible, in particular, for the treatment to be performed in such a way that, after the treatment has started and before the treatment is complete, there is at least one user input, by means of which the user can influence the current treatment, in particular by virtue of said user e.g. responding to an automatic query brought about by means of a user interface apparatus of the laboratory instrument, in particular by virtue of confirming or denying an input or undertaking other inputs. In the case of the partly automated treatment, it is possible, in particular, for the treatment to have a plurality of treatment steps which, in particular, are performed automatically and successively in time and which have at least one treatment step that requires a user input, which, in particular, is brought about via a user interface apparatus.

An instrument-controlled treatment is preferably a program-controlled treatment, i.e. a treatment controlled by a program. A program-controlled treatment of a sample should be understood to mean that the process of treatment substantially takes place by working through a plurality or multiplicity of program steps. Preferably, the program-controlled treatment takes place using at least one program parameter, in particular at least one program parameter selected by the user. A parameter selected by a user is also referred to as a user parameter. The program-controlled treatment preferably takes place with the aid of a digital data processing apparatus which, in particular, may be a component of the control apparatus of the laboratory instrument. The data processing apparatus can comprise at least one processor, i.e. a CPU, and/or at least one microprocessor. The program-controlled treatment is preferably controlled and/or performed in accordance with the prescriptions of a program, in particular a control program. In particular, substantially no user activity is required in the case of a program-controlled treatment, at least after acquisition of the program parameters required from the user.

Within the scope of the present invention, a control apparatus generally comprises, in particular, a data processing apparatus, in particular a computer unit (CPU) for processing data and/or a microprocessor, or said control apparatus is a data processing apparatus. A computer unit of the control apparatus of a laboratory instrument is preferably also configured for controlling the treatment process and/or the individual treatments.

The control apparatus of the laboratory instrument and/or the optional user interface apparatus—in particular all of these—can be integrated in one physical instrument unit but can also in each case be independent physical instrument units. A physical instrument unit can, in particular, be a module which is or can be connected to the laboratory instrument. The control apparatus of the laboratory instrument and/or the access control device and/or the optional user interface apparatus or components of these components can also be implemented by software functions or can, in particular, be available as program code. By way of example, a laboratory instrument can comprise a computer which, in combination with software functions, in each case at least partly implements the control apparatus of the laboratory instrument and/or the optional user interface apparatus.

Further preferred configurations of the laboratory apparatus according to the invention and method according to the invention emerge from the following description of the exemplary embodiments in conjunction with the figures and the description thereof. If nothing else is described or if nothing else emerges from the context, the same components of the exemplary embodiments are substantially characterized by the same reference signs. In detail:

FIG. 4a shows, in a perspective side-front view, the network instrument being a shelf and the connector apparatus shown in FIG. 3b.

FIG. 4b shows, in a perspective side-rear view, the connector apparatus shown in FIG. 4a.

FIG. 4c shows, in a perspective side view, the connector apparatus shown in FIG. 4a.

FIG. 5b shows, in a perspective side-front view, partially cut away for illustration purpose, a part of the rear chamber wall including the duct of FIG. 5a.

FIG. 6a shows, in a perspective side view, the shelf and its alignment apparatus acting in combination with the self-aligning structure of the first connector of the connector apparatus shown in FIG. 4a.

Figures 6A, 6B:
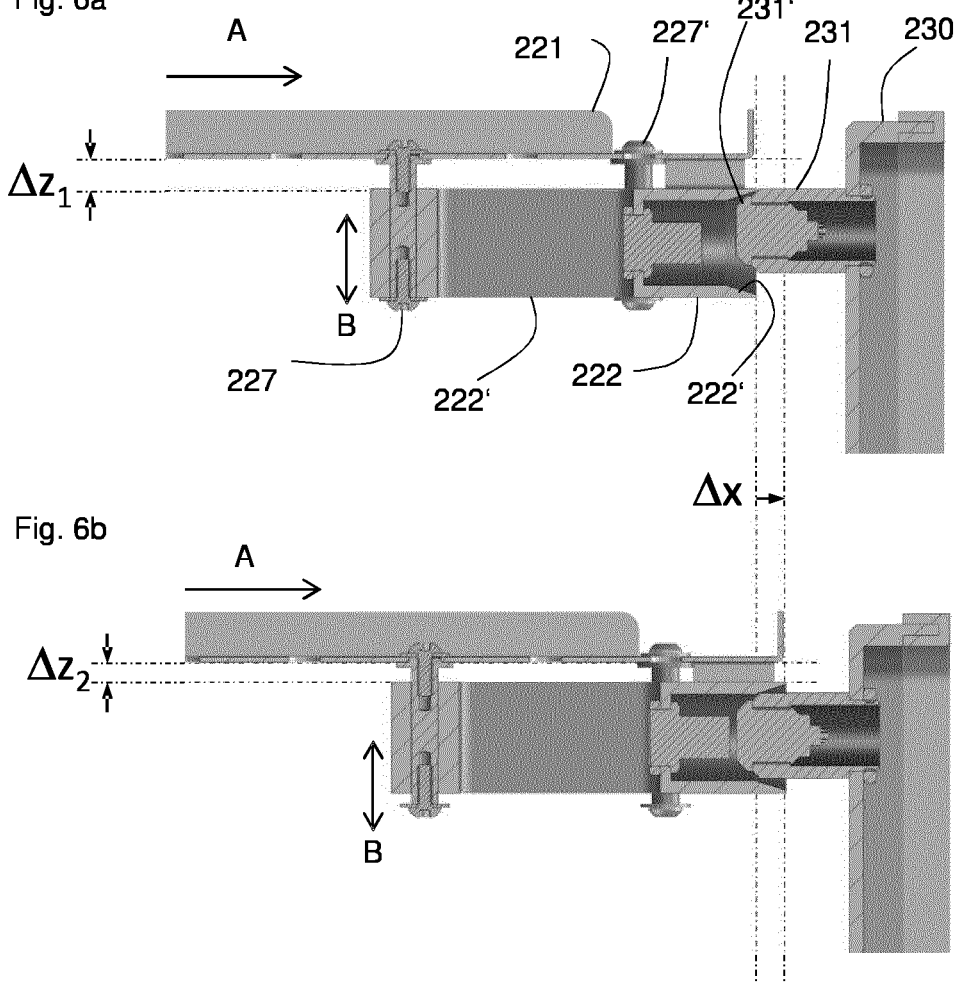

FIG. 6b corresponds to FIG. 6a, wherein the self-alignment has progressed due to a movement of the shelf in horizontal direction A.

Figures 7A, 7B, 7C, 7D, 7E:
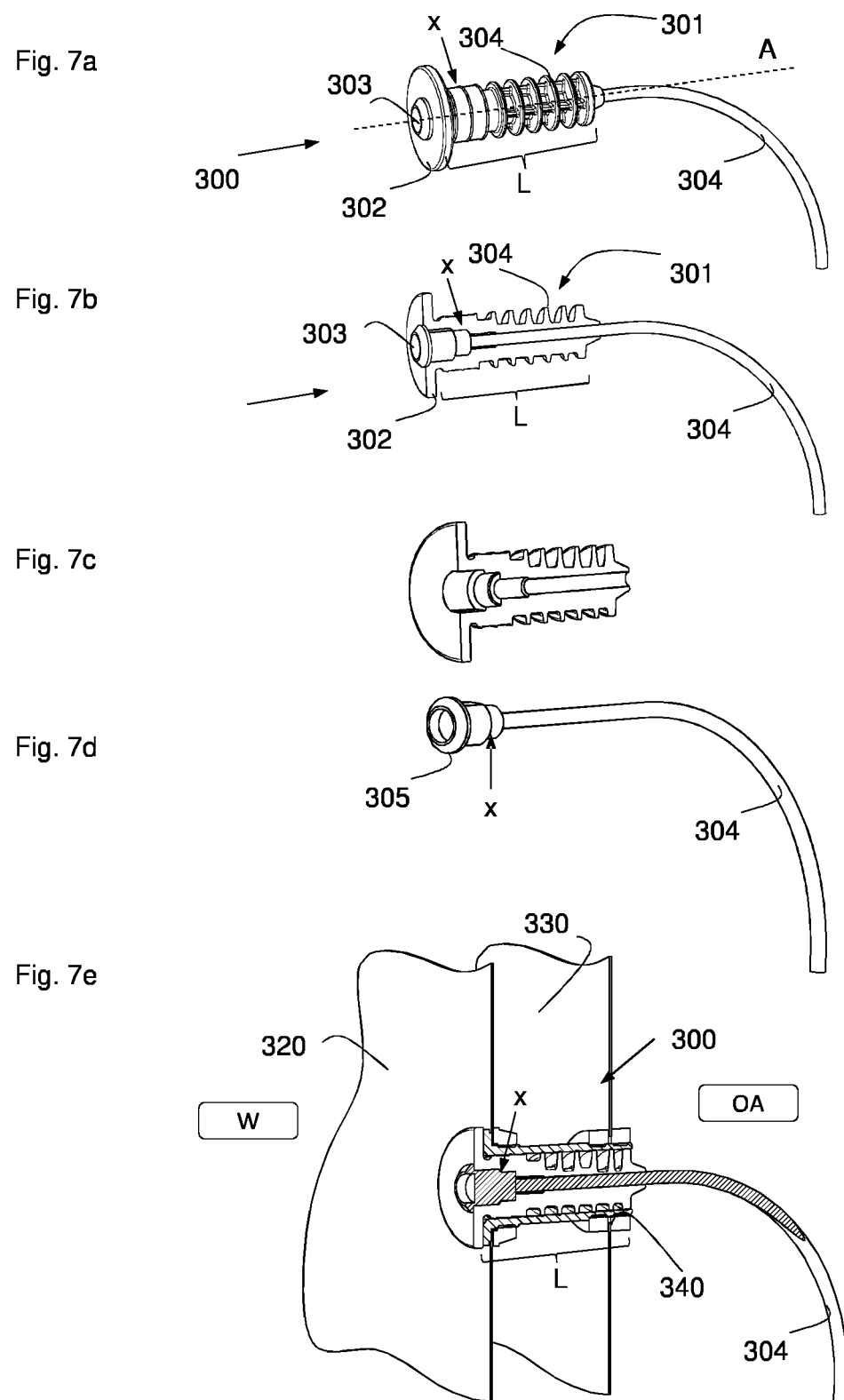

FIG. 7a shows a perspective view of a connector apparatus according to a preferred embodiment and suitable to be used for a laboratory apparatus according to the invention.

FIG. 7b corresponds to FIG. 7a, wherein a half of the connector apparatus is shown cut away.

FIG. 7c shows the housing of the connector apparatus of FIG. 7a, a half of the housing being cut away.

FIG. 7d shows the cable device and its plug member for being arranged inside the housing of the connector apparatus of FIG. 7a.

FIG. 7e shows the connector apparatus of FIG. 7a, a half of the connector apparatus being cut away and being mounted in the duct of the working chamber of the laboratory apparatus according to the invention.

Figure 8A:
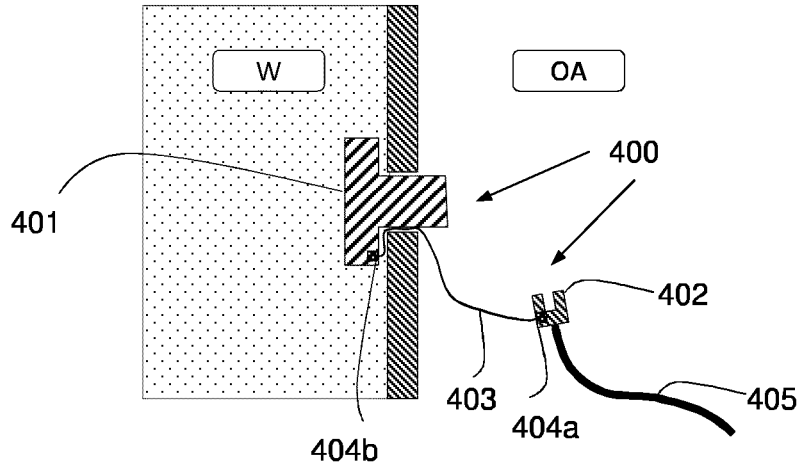

FIG. 8a shows a cross-sectional side view of another connector apparatus according to a preferred embodiment of the laboratory device, in a first position.

Figure 8B:
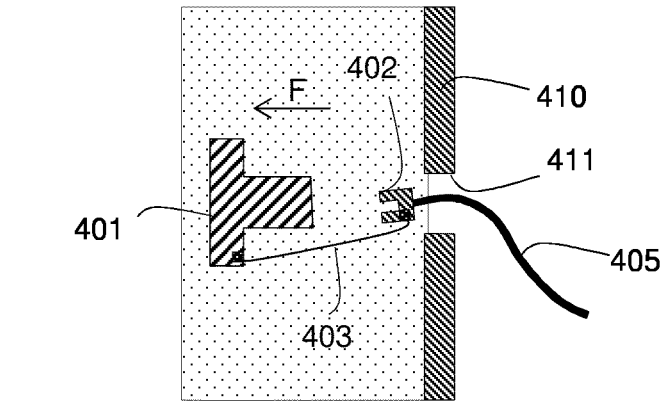

FIG. 8b shows a cross-sectional side view of the connector apparatus of FIG. 8a, in a position when swapping from the first to the second position.

Figure 8C:
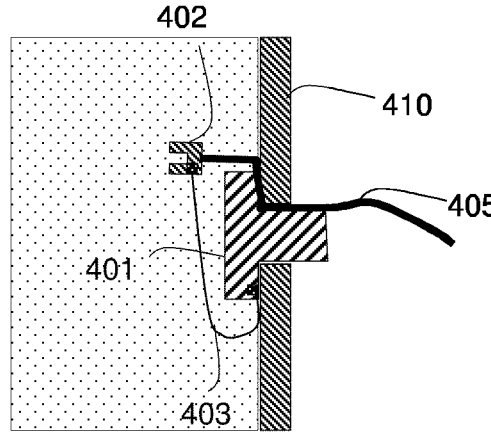

FIG. 8c shows a cross-sectional side view of the connector apparatus of FIG. 8a, in the second position.

Figure 1A:
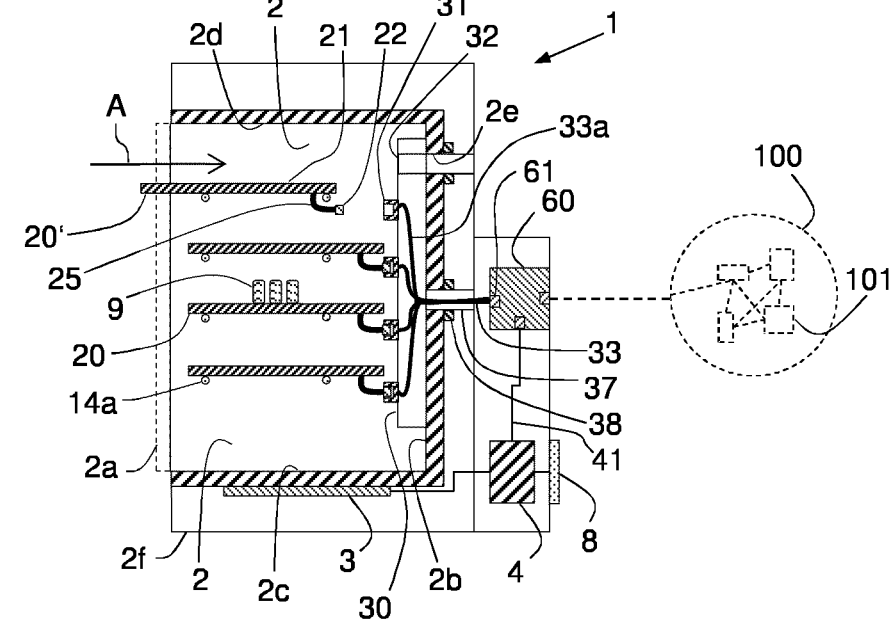
FIG. 1a shows, in a schematic cross sectional side view, a laboratory instrument according to an embodiment of the present invention, being an incubator, including four insertable network instruments formed as shelves.

FIG. 1a shows a laboratory instrument 1 according to an embodiment of the present invention, for working on laboratory samples 9 using a data exchange of data within a laboratory instrument network 100. The exemplary laboratory instrument is a laboratory incubator 1, here a $CO_2$ incubator, which is a microprocessor-controlled instrument designed for cell culture. The laboratory incubator 1 has a cuboid working chamber, forming the incubator chamber 2, which is schematically shown as a rectangle in a light color, in FIG. 1a. The direct-heated, fanless working chamber 2 is designed to provide high humidity levels, minimal vibration and precisely-regulated atmosphere of temperature and gas(ses) required for cell growth in T-flasks, microplates, and other cultureware. They are intended for indoor laboratory use, only.

The incubator chamber 2 is formed by a rear wall 2b, two side walls (not shown), a bottom wall 2c and a top wall 2d, which are integrally formed from metal. The front wall is formed as a door 2a, which is provided for hermetically closing the working chamber in a closed position, to protect the atmosphere inside the incubator chamber against external interferences. The front wall and door 2a is shown in dotted lines in FIG. 1a to indicate that the door is open, while the shelf 20' is inserted into the installed position, thereby sliding along the support elements 14a being part of a frame structure (not shown here in FIG. 1a), resting on the bottom wall 2c to carry the shelves inside the working chamber 2.

The dimensions of the incubator chamber are 54 cm in width, 70 cm in height, 45 cm in depth, having a volume of about 175 liters.

The incubator 1 is configured to keep the air inside the working chamber at a defined temperature between 10° C. and 50° C., a defined humidity of 95%, for example, and at a defined CO2 content value between 0.2% and 20%. This is achieved by a temperature adjusting device for direct-heating of the working chamber 2, a water vapor control (not shown) and a CO2 input valve, which form three treatment apparatuses for performing the respective treatment of the laboratory samples housed in the working chamber and which are exposed to the climate of the defined atmosphere inside the incubator chamber. In FIG. 1*a*, the temperature adjusting device 3 is schematically shown as a component in thermal contact with the working chamber 2.

The incubator has a control apparatus 4 for processing data and for controlling the treatment apparatus 3, inter alia. The incubator 1 also has a user interface apparatus 8, connected to the control apparatus 4, for receiving user inputs and for presenting information on a display of the user interface apparatus 8.

Figure 2A:
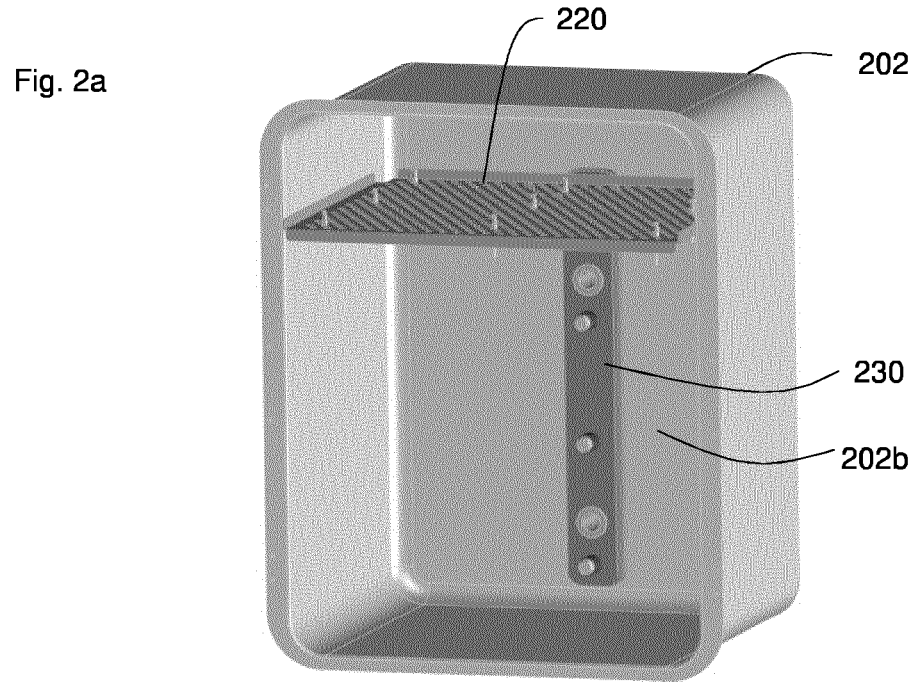
FIG. 2a shows, in a perspective front view, the working chamber of a laboratory instrument according to a preferred embodiment of the invention.

The incubator chamber 2 is configured for housing multiple network instruments, implemented as shelves 20, which are to be inserted into the working chamber in the installed position, which is also shown for three shelves 20 in FIG. 1*a*, and which are, respectively, configured to perform a work step related to the laboratory samples. In FIG. 1*a*, the shelf 20' is shown in a status, where it is forwarded by user along the horizontal direction A to position it in the installed position, where the first connector receives and couples with the second connector 22 of the shelf 20'. In FIG. 2*a*, all shelves are in the installed position, the door 2*a* is closed, the working chamber is hermetically isolated from the outside, except from the two ducts 2*e*, which allow, first, to provide a cable connection between the connector apparatus 30 and the communication apparatus 60, and second, allow for the user to insert further devices inside the working chamber, which require a cable connection with the outside of the working chamber, while the door 2*a* is closed.

The incubator comprises a network interface apparatus, including the connector apparatus 30 and the communication apparatus 60 for providing a network connection between the insertable network instruments 20 and the laboratory instrument network 100. The network connection serves for providing, in the installed position, the exchange of the data between the insertable network instruments 20 and the laboratory instrument network.

The connector apparatus 30 has a base body in the form of a hollow rectangular bar, wherein the bar is open at its rear side facing the rear wall 2*b* of the working chamber 2. The base body has two channel members in the form of a tube 37, which are arranged to extend through the ducts 2*e*. The channel members are firmly connected to the base body of the connector apparatus 30. They also serve as mounting members for releasably mounting the connector apparatus 30 to the working chamber of the laboratory instrument. For this purpose, further mounting members formed as threaded rings 38 are screwed on corresponding outer threads of the channel members 37. The upper of the channel members 37 serves as an access port for allowing the user to deposit cables and the like through the channel member. The lower channel member is used to let the cable device 33 extend through the channel, thereby providing the data connection between the inside of the working chamber and the outside. The ducts 2*e* and the channel members 37 may comprise thermally insulating material respectively, in order to avoid forming a thermal bridge between the inside and the outside.

The channel members 37 may also be used to suspend the working chamber inside the outer housing 2*f* to a carrier frame of a base structure (not shown in FIG. 1*a*) of the laboratory instrument. The carrier frame may carry all components and comprise support elements (not shown in FIG. 1*a*) resting between the bottom of the carrier structure and the ground. This means that the connector apparatus may be used as a mounting device by being configured to mount the working chamber to the carrier frame, using the at least one channel member as a mechanical connector between the working chamber and the carrier frame.

Figure 1B:
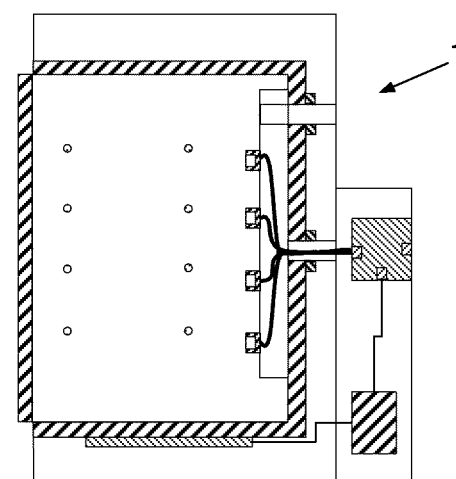
FIG. 1b shows the laboratory instrument of FIG. 1a, without the shelves, the chamber door being closed.
Figure 1C:
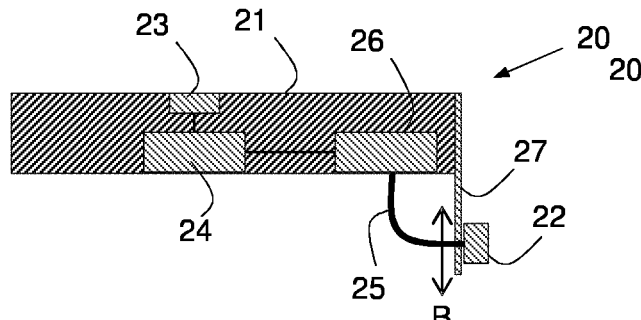
FIG. 1c shows, in a schematic cross sectional side view, an insertable network instrument according to an embodiment of the present invention, being a shelf.

The communication apparatus 60 is an Ethernet switch 60, in the present example in FIGS. 1*a*, 1*b*. The Ethernet switch 60 has sockets 61 for connecting an Ethernet type connecting cable 33*a* of the cable device 33 between the socket 61 and the first connectors 31 of the connector apparatus 30 inside the working chamber. Consequently, each insertable network instrument has a corresponding plug 22, forming the second connector.

The Ethernet switch 60 is also used to connect the incubator's communication apparatus (not shown), which may be an Ethernet network adapter, with the laboratory instrument network 100. This is indicated by the connector 7 connected with a port 61 of the switch 60. The control apparatus 4 may, alternatively (not shown), also incorporate the communication apparatus, and may be realized by any microcontroller having an Ethernet interface.

The shelf 20', 20 has a base part 21, shown more in detail in FIG. 2*c*, being a substantially planar plate or grid, designed for extending along a horizontal plane during operation, having a basically rectangular outer contour, and an electrical data processing control apparatus 24 which is electrically connected with the communication apparatus 26 of the shelf. The shelf has a movable Ethernet cable 25, which connects the second connector 22 with the communication apparatus 26, which is an Ethernet network adapter.

The shelf also has a working apparatus 23, which may be a cell counting device in this example. The shelf controls the cell counting device to take images from a cell population contained, for example, inside the sample containers 9, when the same are placed to be monitored on the shelf. The image data may contain values of light intensity received by the light-sensitive elements of the image sensor, e.g. CMOS sensor. While it is not mandatory required, an image may represent a real image of objects, e.g. a cell layer in a cell culture receptacle. The image data are transferred from the shelf into a data processing network instrument 101 inside the laboratory instrument network 100, where the image data are stored and evaluated. Since the data processing network instrument is located outside the working chamber, it is avoided that the power loss due to the energy consumption of the evaluating data processor is emitted as heat into the incubator chamber, which may cause local raise of temperature disturbing the defined growth conditions of the cells in vessels 9. Start and end of the activity of the working apparatus 23 may be remote controlled, via the network connection of the network 100, by a user or a program run by another network instrument.

In another preferred example, not shown, the user interface apparatus 8 could be a data processing network instrument having enough computing power to evaluate the image data. Since the user interface apparatus 8 can be also a network instrument connected to the network 100, the data could be transferred to the user interface apparatus 8 via the network 100. This is in particular useful for the user in case that the user interface apparatus 8 would be a portable device, like a tablet computer, to be carried anywhere in a laboratory, or even more far away and connected wireless or by cable to the network 100 via the internet or another remote connection.

The shelf 20 has an alignment apparatus 27 for providing a movable mechanical link between the second connector 22 and the base part 21. For example, the second connector 22 may be forced by the alignment apparatus 27 to follow a vertical path along the direction B, which may be defined by a path restriction element, in particular a slotted plate (not shown). Alternatively or additionally, such an alignment apparatus may also be provided for the first connector at the connector apparatus. Another embodiment of such an alignment apparatus will be described with respect to FIGS. 6a, 6b, below.

FIG. 2a shows the working chamber 202 of a laboratory instrument according to another preferred embodiment of the invention, wherein the laboratory instrument may correspond to the incubator of FIG. 1a. In analogy to FIG. 1a, a connector apparatus 230 is arranged in contact with the inner rear wall 202b.

Figure 2B:
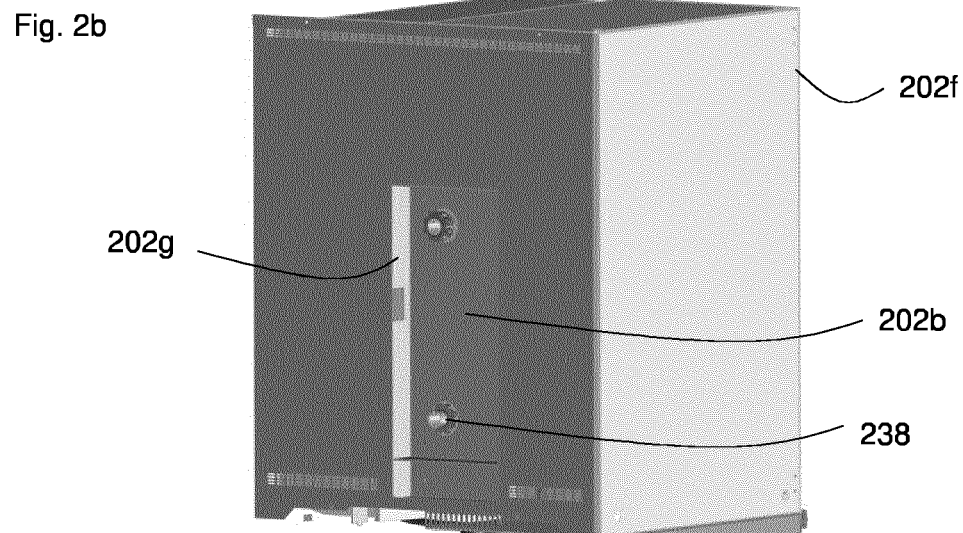
FIG. 2b shows the outer housing of the laboratory instrument and the working chamber of FIG. 2a in a perspective rear view.
Figure 3A:
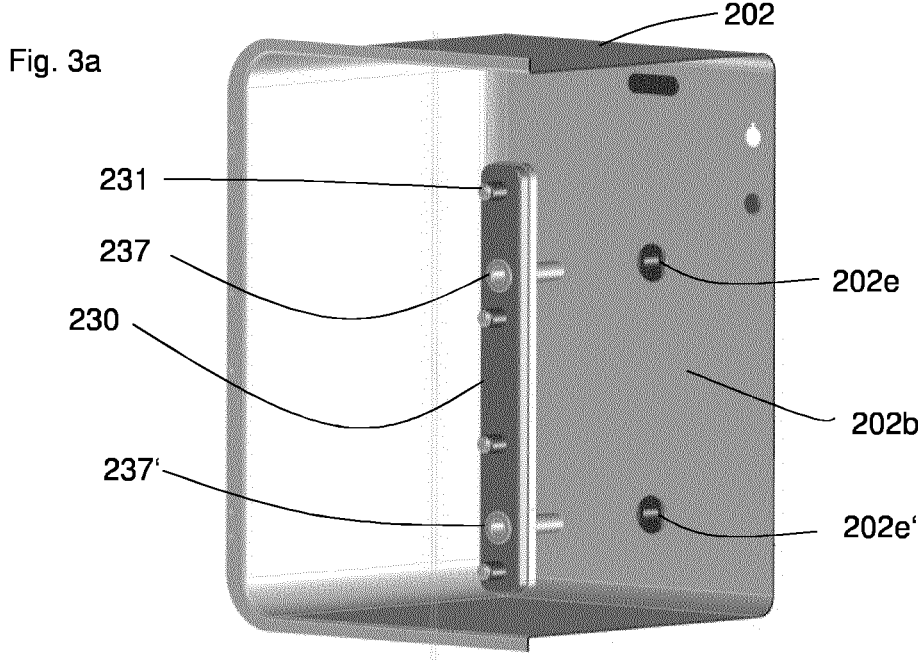
FIG. 3a shows the working chamber of FIG. 2a in a perspective front view, partially cut away for illustration purpose.

FIG. 2b shows the outer housing 202f of the laboratory instrument and the working chamber 202 of FIG. 2a. The outer housing defines a compartment 202g. The compartment 202g is accessible for the user to mount and unmount the connector apparatus 230, if needed. To unmount, the user has simply to disconnect the cable device 233 (not shown) from the switch ports 261 (not shown) of switch 260 (not shown), and has to unscrew the threaded ring-nuts 238 from the threaded channel members 237. Preferably, the switch is hidden to the user behind the outer housing 202f and only the switch ports 261 are exposed to the user, preferably inside the compartment 202g. FIG. 3a shows the working chamber 202 of FIG. 2a, partially cut away for illustration purpose, where the connector apparatus 230 is unmounted from the rear wall 202b of the chamber. The upper channel member 237, which forms an access port to the inside of the working chamber 202 from the outside, and the lower channel member 237', which receives the cable device 233 (not shown), are firmly connected to the strip-shaped base body 230 of the connector apparatus 230. The channel members are formed to engage the ducts 202e, which are provided to extend through the rear chamber wall 202b.

Figure 3B:
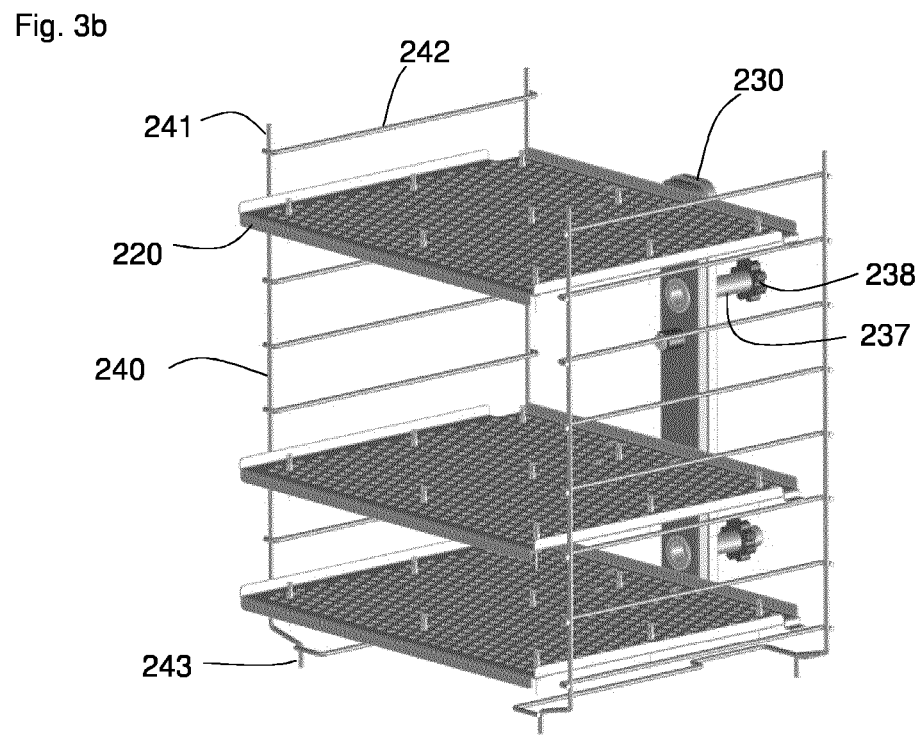
FIG. 3b shows, in a perspective front view, a holding frame, to be placed inside the working chamber of FIG. 2a, for holding one or more insertable network instruments according to an embodiment of the present invention, being shelves, and shows the connector apparatus of the network interface apparatus according to a preferred embodiment of the invention.

FIG. 3b shows, in a perspective front view, a holding frame 240, to be placed inside the working chamber of FIG. 2a, for holding one or more insertable network instruments according to an embodiment of the present invention, being shelves 220 here, and shows the connector apparatus 230 of the network interface apparatus according to a preferred embodiment of the invention. The holding frame is a rack composed of a frame of metal rods, in particular vertical rods 241, horizontal rods 242 and further horizontal rods 244 (not visible), which provide support elements 214a (compare the support elements 14a in FIG. 1a) for carrying the shelves 220. The shelves may be positioned by a user by sliding them into the holding frame, like a baking tray into an oven. The holding frame rests with its rod ends 243 located at the bottom on the bottom chamber wall, when the holding frame is inserted inside the working chamber. In the inserted position, the holding frame preferably is dimensioned to substantially extend through the overall inner space of the working chamber.

FIG. 4a shows the network instrument being a shelf 220 and the connector apparatus 230 shown in FIG. 3b. FIG. 4b shows the connector apparatus 230 shown in FIG. 4a, which is a strip shaped hollow cuboid having a hollow inner space

239, which serves to receive and guide the cable device 233 (not shown here). FIG. 4c shows, in a perspective side view, the connector apparatus shown in FIG. 4a.

Figure 5A:
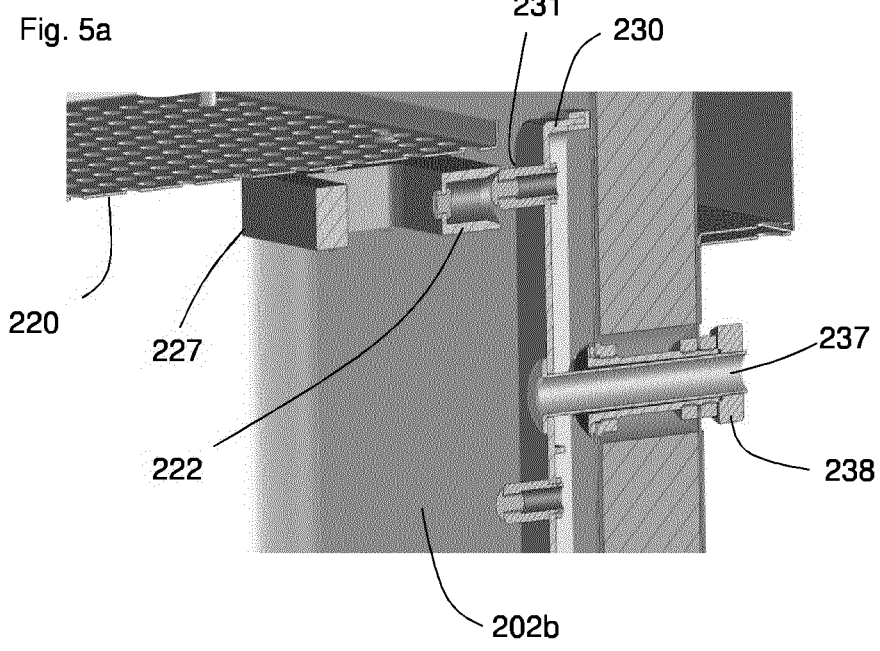
FIG. 5a shows, in a perspective side-front view, partially cut away for illustration purpose, the network instrument being a shelf of FIG. 4a, including an alignment apparatus of the shelf and the second connector, and shows a part of the connector apparatus including a channel member extending through a duct of the rear chamber wall.

FIG. 5a shows, partially cut away for illustration purpose, the network instrument being a shelf 220 of FIG. 4a, including an alignment apparatus 227 of the shelf and the second connector 222, and shows a part of the connector apparatus 230 including a channel member 237 extending through a duct 202e of the rear chamber wall 202b.

Figure 5B:
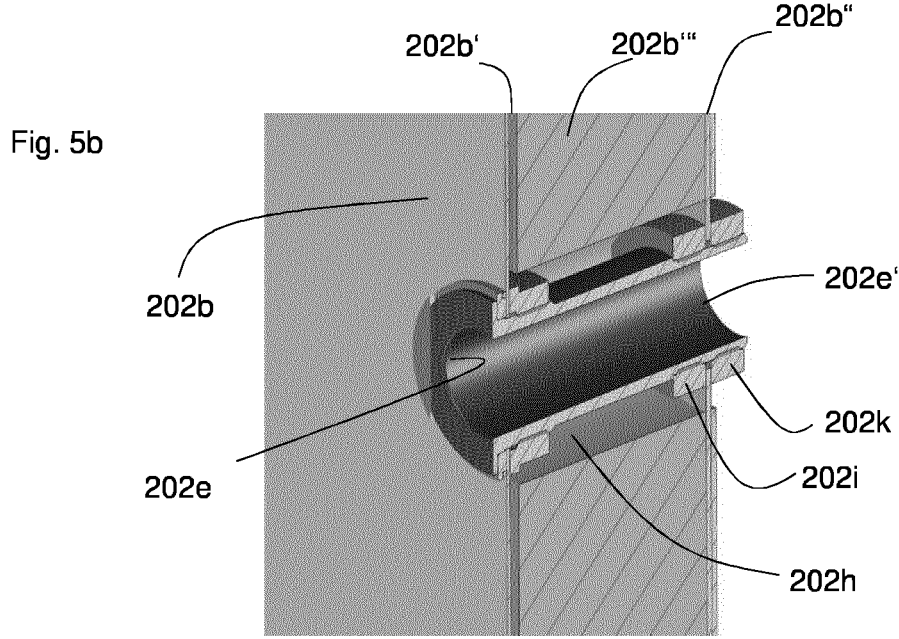

FIG. 5b shows, partially cut away for illustration purpose, a part of the rear chamber wall 202b including the duct 202e of FIG. 5a, which is shown in detail here. The duct 202 is composed of a sleeve member. The rear chamber wall is shown in detail to include an inner rear wall 202b', an outer rear chamber wall 202b", and an thermally insulating layer 202b''', which is sandwiched by the inner and outer rear walls. An opening extending through all layers of the rear chamber wall allows to place sleeve member 202a' to extend through said opening for providing the duct 202e. The sleeve member may be made from a polymer having a sufficiently low thermal conductivity, e.g. polycarbonate. The sleeve member is fixed to the inner rear wall 202b' and the outer rear chamber wall 202b" by opposing mounting rings 202i, 202k, which surround the end of the sleeves and provide a clamping force to the inner rear wall 202b' and the outer rear chamber wall 202b".

FIG. 6a shows, in a perspective side view, the shelf 220 with the base part 221 and its alignment apparatus 227, 227' acting in combination with the self-aligning structure 222' of the first connector of the connector apparatus shown in FIG. 4a and with the self-aligning structure 231'. The self-aligning structure is a guiding surface 222', 231', provided at the first and second connector, respectively. The guiding surface is respectively a sloped surface inclined relative to direction A. The guiding surfaces increase the area and the chances for receiving the plug 231 into the socket 222.

When the network instrument is moved along direction (A) by a user, the guiding surfaces 222', 231' will come into contact with each other. Due to the inclination of the guiding surface with respect to the direction A, a part of the force applied by a user along direction A is translated into a movement into direction B, which means that the first and second connectors are forced to align and to center in the connected position.

Network instrument according to claim 10, wherein the path (B) is a straight path and a direction (C) is defined to be not perpendicular to the path (B), wherein the alignment apparatus (27; 227, 227') is configured to force the second connector (222, 222") to align with the first connector (31; 231) of a laboratory instrument (1) when driven by a force component directed along the direction (C), the force component being generated by a user when installing the network instrument (20; 20'; 220) into the installed position, wherein said force component acts on the second connector (222) thereby moving the second connector along the path direction (B) and towards the first connector (31; 231) guided by the self-aligning structure (231'; 222') of the first connector and/or the second connector.

FIG. 6b corresponds to FIG. 6a, wherein the centering and self-alignment of the first and second connector has progressed due to a movement of the shelf in horizontal direction A. Comparing FIGS. 6a and 6b shows that proceeding the movement of the shelf 220 by a distance $\Delta x$ in direction A for reaching the installed position will amend the distance of the connector holder 222' from the underside of base part 221 from $\Delta z_1$ to $\Delta z_2$. It should be noted that the principle of self-aligning of connectors not only includes the cases tha an alignment is provided along one direction of a coordinate system upon movement of the network instrument along the direction x=A, as described before, but also the cases that an alignment is provided along two directions of space, in particular along the two axes y and z of a Kartesian coordinate system, when the network instrument is inserted along the direction x=A.

The alignment apparatus comprises three guiding tubes 227, 227' firmly connected to the shelf in vertical direction perpendicular to the plate of base part 221. The guiding tubes form path restricting elements defining a path in vertical direction. The ring-shaped connector holder 222' has three vertical sliding holes to receive a guiding tube, respectively. The connector holder 222' is movably connected to the guiding tubes. The second connector 222, being a socket including a pocket, is firmly connected to the connector holder 222'.

The alignment apparatus 227, 227' is configured to force the second connector 222 to align with the first connector 231 of a laboratory instrument when driven by a force component, which is generated by a user when installing the network instrument into the installed position by movement along the horizontal direction A, wherein said force component, which is not perpendicular to a straight path B of the path restricting element 227, 227', acts on the second connector 222 thereby moving the second connector 222 along the path direction B and towards the first connector 231, guided by a self-aligning structure 222', 231' of the first and second connector. Thereby, a blind-mate connection is realized, resulting in a comfortable and reliable usability of the system including the network interface apparatus of the laboratory instrument and the insertable network instruments.

In FIGS. 7a to 7e, another connector apparatus 300 is shown. It has a housing 301. The housing is configured to protect the electrical contacts and/or plug components of a cable device 304 at a position labeled "x" inside the housing against the conditions inside the working chamber "W" (FIG. 7e) of the laboratory instrument. The housing 301 is configured to resist and protect the cable contacts against the exposure to a humid environment and/or environment, which is exposed to cleaning and disinfection chemicals, and at a large range of temperatures between 120° C. to 180° C., the housing being made using FKM.

The housing has a port 303 allows to connect an electrical plug to complementary plug socket (not visible) of the cable device inside the housing. The electrical contacts inside the housing are displaced from the port 303 towards the inside of the housing to the position x, for protecting the contacts against thermal influences, in particular during a possible high-temperature phase inside the working chamber W.

The housing 301 of the connector apparatus 300 is inserted into the duct 340, in FIG. 7e, which connects the inside W of the working chamber with an outside area labeled "OA" being outside the working chamber. The housing 301 of the connector apparatus is elastically deformable. Thereby, a sealing is provided for the duct 340 when the housing 300 is located and mounted inside the duct in a mounting position, shown in FIG. 7e. Moreover, the housing has a retaining means, which retains the connector apparatus 300 inside the duct 340 in the mounting position. Assuming a virtual axis A running along the duct, the elastic property of the housing provides a retaining force in radial direction. A flange 302 is located around the port 303 of the housing, which retains the housing at the wall 320 of the working chamber in an axial direction A.

The elastic housing 301 of the connector apparatus has multiple elastic lamella members 304, which are disc-shaped and which extend in axial direction for sealing and/or pressing against the duct's inner wall, as can be seen in FIG. 7e, in the mounting position of the connector apparatus 300. The air, which is located between two adjacent lamella members, serves as a thermal insulator between the working chamber and the area outside the working chamber.

The housing 301 or the jacket of the housing of the connector apparatus extends along a length L of the duct in the mounting position, along the full length of the duct, starting inside the working chamber or at an inner wall of the working chamber and ending in an area outside the working chamber. Said length L is 15 cm in the example. Thereby, the duct can be sealed along the full length L in the mounting position of the connector apparatus using the housing.

In FIGS. 8a to 8c, the connector apparatus 400 is basically a two part device, having a first part 401 serving as a stopper, which is configured for being inserted inside the duct 411 in a mounting position and providing a sealing of the working chamber W. The cable device 405 has a plug member 402, which is configured to be connected with a complementary plug member of a device located inside the working chamber. The plug member and the cable device are arranged movable and capable to be moved through the duct. A flexible cord member 403 has a length suitable to reach from inside the working chamber to an area OA outside the working chamber, said length being for example between 10 cm and 40 cm. One end of the cord member 403 is firmly connected to the stopper at a fixing point 404b, the other end is firmly connected to the end of the cable device, here to the plug member 402 at the end of the cable device at a fixing point 404a. The stopper is made from a material suitable to resist temperatures of between 120° C. and 180° C., for example FKM. Such a capability for resisting the high temperatures is, on the other hand, not required for the cable device 405 and the plug member 402 of the cable device.

In a first position of such a two-part connector apparatus, shown in FIG. 8a, the stopper 401 is in the mounted position, the cable device 405 is in the area OA outside the workings chamber W and the flexible cord member 403 extends through the duct 411, being arranged between the stopper 401 and the duct 411. In the first position, the working chamber W may be set to high temperatures, which the stopper 401 can withstand without being damaged. The cable device 405 is not exposed to said temperatures.

For connecting an insertable instrument to the cable device, the user may pull the stopper out of the duct in the direction F towards the inside of the working chamber, thereby pulling the cable device by means of the cord member, see FIG. 8b. Once the plug member 402 of the cable device 405 is located inside the working chamber W, the complementary plug of an insertable instrument may be connected and the duct may be closed again using the stopper.

In the second position, shown in FIG. 8c, the stopper 401 is mounted in the duct 411, while the cable 405 of the cable device runs through the duct, being arranged between the stopper 401 and the duct 411. Since the stopper is fully elastically deformable, the duct 411 is also sealed by the stopper 401 in the second position.

The two-part embodiment of the connector apparatus 400 allows to use an insertable instrument temporarily, without a need to move the laboratory device for accessing the duct, which is often located at a rear wall of a laboratory device. Access to the duct is provided through the working chamber, and a high temperature phase can be used with such a connector apparatus, while protecting the cable device against the high temperatures.

The invention claimed is:

1. Laboratory instrument for working on laboratory samples, the laboratory instrument being a laboratory incubator, a laboratory sample shaker, a laboratory freezer, an automated pipetting apparatus, or a thermal cycler, and comprising:
   a working chamber for housing sample containers containing the laboratory samples, the working chamber having at least one door opening and at least one door member for allowing the user accessing and equipping the working chamber with microtiter plates or with one or more sample containers, the one or more sample containers configured for containing sample volumes of between 5 ml and 100 ml,
   a treatment apparatus comprising a heating and/or cooling device being configured to provide at least a predetermined or user defined temperature within the working chamber,
   a network interface apparatus for providing a network connection capable of exchanging data for at least one network instrument, when the same is arranged and installed in an installed position inside the working chamber, the network interface apparatus comprising:
   a communication apparatus being arranged outside the working chamber and providing the network connection;
   a connector apparatus being arranged inside the working chamber and including multiple first connectors mounted to a base body of the connector apparatus, each first connector being mounted in a fixed position relative to the base body and configured for connecting with a network instrument, each first connector being arranged facing the inside of the working chamber and being connected with the communication apparatus for allowing the data exchange; and
   a cable device, which connects the multiple first connectors with the communication apparatus;
   the laboratory instrument comprising multiple network instruments, wherein each network instrument is located inside the working chamber and removably connected to the network interface apparatus for exchanging data, each network instrument comprising a control apparatus for processing the data, a communication apparatus configured to exchange the data between the control apparatus and the network interface apparatus, and a second connector being removably connected to one of the multiple first connectors of the network interface apparatus,
   wherein the working chamber is formed by at least one chamber wall surrounding the inside of the working chamber, and the at least one chamber wall comprises a duct for connecting the multiple first connectors with the communication apparatus, thereby allowing the data exchange along the duct through the at least one chamber wall, the duct being configured to provide a passage for the cable device, and
   wherein the connector apparatus comprises a housing insertable into the duct, the housing being configured to protect the cable device inside against temperature, humidity, and contamination from the conditions of the working chamber, thereby sealing the duct.

2. Laboratory instrument according to claim 1, wherein the connector apparatus is configured to be releasably mounted to face the inside of the working chamber of the laboratory instrument.

3. Laboratory instrument according to claim 2, wherein the connector apparatus comprises at least one mounting member for releasably mounting the connector apparatus to the working chamber of the laboratory instrument.

4. Laboratory instrument according to claim 1, wherein at least one first connector is a mechanical connector including at least one conductor for providing an Ohmic contact when mechanically contacted by the conductor of at least one second connector in a contacting position, wherein preferably the at least one first connector is configured to be a blind mate connector by providing at least one self-aligning structure for guiding the relative motion of the at least one first connector and the at least one second connector.

5. Laboratory instrument network for implementing a workflow related to working on laboratory samples, which comprises at least one laboratory instrument according to any one of claim 1, 2, 3 or 4 and at least one network instrument which are connected for allowing a data exchange.

6. A system for working on laboratory samples, comprising:
   a laboratory instrument according to claim 1;
      wherein at least one of the multiple network instruments comprised by the laboratory instrument is arranged and installed in an installed position inside the working chamber and is removably connected to the network interface apparatus for exchanging data, the at least one network instrument comprising
      a control apparatus for processing the data,
      a communication apparatus configured to exchange the data with the network interface apparatus, and
      a second connector removably connected to one of the multiple first connectors of the network interface apparatus.

7. System according to claim 6, wherein the at least one network instrument comprises a base part and an alignment apparatus for providing a movable mechanical link between the second connector and the base part,
   wherein the second connector is configured to be a blind mate connector by including a self-aligning structure for guiding the relative motion of the first connector and the second connector.

8. System according to claim 7, wherein the alignment apparatus comprises at least one path restricting element, which is configured to allow a relative mobility of the second connector and the base part and to provide a restricted guidance of the second connector and the base part to move along a path defined by the path restricting element, which engages with the second connector for restricting the movement of the second connector to the path.

9. System according to claim 8, wherein the self-aligning structure comprises at least one guiding surface, which is part of the first connector and/or the second connector, wherein the alignment of the first and second connector is achieved by a relative motion of the first and second connector guided by the guiding surface.

10. System according to claim 6, the at least one network instrument comprising a working apparatus for performing at least one work step related to the laboratory samples and/or which comprises a measurement device, which is configured to measure at least one measurement parameter inside the working chamber.

11. System according to claim 6, which is formed to be a shelf for carrying laboratory vessels.

\*  \*  \*  \*  \*